United States Patent
Ohba

(10) Patent No.: US 10,191,701 B2
(45) Date of Patent: Jan. 29, 2019

(54) IMAGE FORMING APPARATUS HAVING A CONFIDENTIAL BOX FUNCTION

(71) Applicant: Konica Minolta, Inc., Chiyoda-ku, Tokyo (JP)

(72) Inventor: Shin Ohba, Toyokawa (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/357,087

(22) Filed: Nov. 21, 2016

(65) Prior Publication Data

US 2017/0160996 A1 Jun. 8, 2017

(30) Foreign Application Priority Data

Dec. 8, 2015 (JP) .................. 2015-239553

(51) Int. Cl.
*G06K 15/00* (2006.01)
*G06F 3/12* (2006.01)

(52) U.S. Cl.
CPC .......... *G06F 3/1238* (2013.01); *G06F 3/1222* (2013.01); *G06F 3/1248* (2013.01); *G06F 3/1285* (2013.01)

(58) Field of Classification Search
None
See application file for complete search history.

(56) References Cited

U.S. PATENT DOCUMENTS

| 2007/0019231 | A1* | 1/2007 | Maeshima | G03G 21/00 358/1.15 |
| 2011/0043851 | A1* | 2/2011 | Tajima | H04N 1/00347 358/1.15 |

FOREIGN PATENT DOCUMENTS

| JP | H11-149451 A | 6/1999 |
| JP | 2004056314 A | 2/2004 |
| JP | 2004104411 A | 4/2004 |
| JP | 2004202846 A | 7/2004 |
| JP | 2005324450 | 11/2005 |
| JP | 2006015625 A | 1/2006 |
| JP | 2006-163261 A | 6/2006 |
| JP | 2007-058543 A | 3/2007 |
| JP | 2007083439 A | 4/2007 |
| JP | 2012141948 A | 7/2012 |
| JP | 2014-010512 A | 1/2014 |

OTHER PUBLICATIONS

Office Action (Decision of Rejection) dated Apr. 26, 2018, by the Japanese Patent Office in corresponding Japanese Patent Application No. 2015-239553, and an English Translation of the Office Action. (6 pages).

Office Action issued by the Japanese Patent Office dated Jan. 15, 2018 in corresponding Japanese Application No. 2015-239553 (25 pages).

\* cited by examiner

*Primary Examiner* — Dov Popovici
(74) *Attorney, Agent, or Firm* — Buchanan Ingersoll & Rooney PC

(57) ABSTRACT

An image forming apparatus including a control unit configured to have: a confidential box function; a status managing function; an information displaying function; and an image forming function. The control unit is configured to control a file name of the print job to be displayed in the operation display unit in a masked state and in a mask released state to maintain confidentiality in print job history listings and print job status listings.

19 Claims, 27 Drawing Sheets

FIG. 4
123G1

| MECHANICAL STATE | JOB LIST | READ | COPY | SCAN |
|---|---|---|---|---|

RIP PROCESS IS EXECUTED

| DEVELOPMENT STATUS | CONFIDENTIAL JOB | OUTPUT RESERVATION JOB | OUTPUT HISTORY | NO-OUTPUT HISTORY |
|---|---|---|---|---|

| FILE NAME | USER NAME | MODE | NUMBER OF PAGES | STATE |
|---|---|---|---|---|
| ☐ ******* | UserA | PRINTER | 5 | MIDDLE OF RIP |
| | | | | |
| | | | | |
| | | | | |
| | | | | |
| | | | | |

[DELETE]

| MECHANICAL STATE | JOB LIST | READ | COPY | SCAN |
|---|---|---|---|---|

THIS IS BOX FUNCTION.
PLEASE SELECT PROCESSED BOX.

| DEVELOPMENT STATUS | CONFIDENTIAL JOB | OUTPUT RESERVATION JOB | OUTPUT HISTORY | NO-OUTPUT HISTORY |
|---|---|---|---|---|

| BOX NAME | USER NAME | MODE | NUMBER OF PAGES | NUMBER OF COPIES | | |
|---|---|---|---|---|---|---|
| ☐ BOX A | | | | | | |
| ☐ BOX B | | | | | | |

123G2a (BOX A)
123G2b (BOX B)

Figure 7:
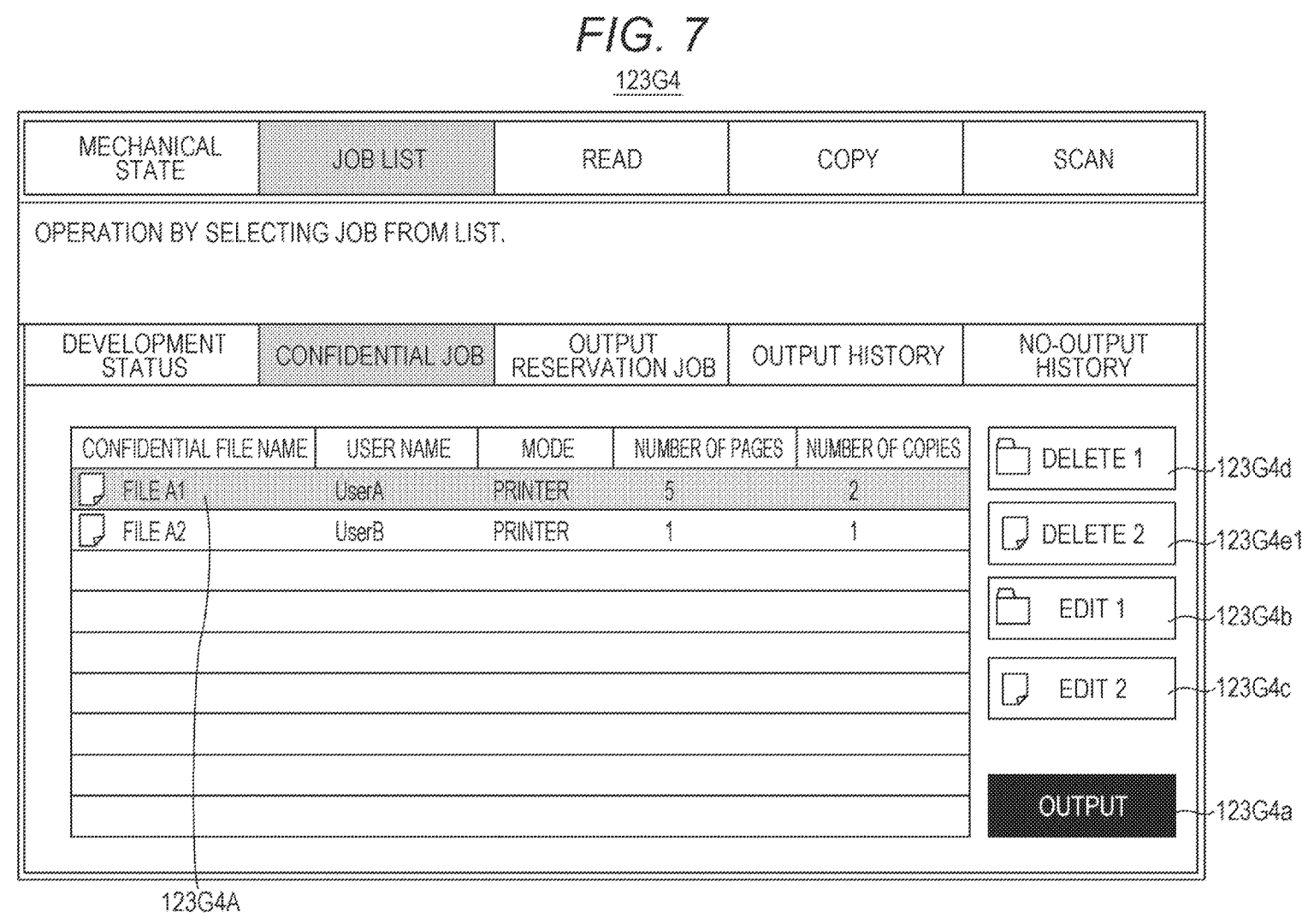

| MECHANICAL STATE | JOB LIST | READ | COPY | SCAN |
|---|---|---|---|---|

OPERATION BY SELECTING JOB FROM LIST.

| DEVELOPMENT STATUS | CONFIDENTIAL JOB | OUTPUT RESERVATION JOB | OUTPUT HISTORY | NO-OUTPUT HISTORY |
|---|---|---|---|---|

| CONFIDENTIAL FILE NAME | USER NAME | MODE | NUMBER OF PAGES | NUMBER OF COPIES |
|---|---|---|---|---|
| FILE A1 | UserA | PRINTER | 5 | 2 |
| FILE A2 | UserB | PRINTER | 1 | 1 |
| | | | | |
| | | | | |
| | | | | |
| | | | | |

- DELETE 1 — 123G4d
- DELETE 2 — 123G4e1
- EDIT 1 — 123G4b
- EDIT 2 — 123G4c
- OUTPUT — 123G4a

| MECHANICAL STATE | JOB LIST | READ | COPY | SCAN |
|---|---|---|---|---|

OUTPUT RESERVATION JOB LIST IS DISPLAYED

| DEVELOPMENT STATUS | CONFIDENTIAL JOB | OUTPUT RESERVATION JOB | OUTPUT HISTORY | NO-OUTPUT HISTORY |
|---|---|---|---|---|

| FILE NAME | USER NAME | MODE | NUMBER OF PAGES | STATE |
|---|---|---|---|---|
| ******* | UserA | PRINTER | 5 | IN MIDDLE OF OUTPUT |
| FILE B1 | UserB | PRINTER | 4 | WAITING FOR OUTPUT |
| FILE C1 | UserC | COPY | 1 | WAITING FOR OUTPUT |
| ******* | UserA | PRINTER | 1 | WAITING FOR OUTPUT |
| ******* | UserE | PRINTER | 1 | WAITING FOR OUTPUT |

DELETE

| MECHANICAL STATE | JOB LIST | READ | COPY | SCAN |
|---|---|---|---|---|

OUTPUT RESERVATION JOB LIST IS DISPLAYED

| DEVELOPMENT STATUS | CONFIDENTIAL JOB | OUTPUT RESERVATION JOB | OUTPUT HISTORY | NO-OUTPUT HISTORY |
|---|---|---|---|---|

DELETE

| FILE NAME | USER NAME | MODE | NUMBER OF PAGES | STATE |
|---|---|---|---|---|
| FILE A1 | UserA | PRINTER | 5 | IN MIDDLE OF OUTPUT |
| FILE B1 | UserB | PRINTER | 4 | WAITING FOR OUTPUT |
| FILE C1 | UserC | COPY | 1 | WAITING FOR OUTPUT |
| FILE A2 | UserA | PRINTER | 1 | WAITING FOR OUTPUT |
| ******* | UserE | PRINTER | 1 | WAITING FOR OUTPUT |

123G5A1
123G5A2
123G5E1

| CONFIDENTIAL BOX NAME | PASSWORD | STATE | PAST JOB ID | CURRENT JOB ID |
|---|---|---|---|---|
| BOX A | a12345 | OPENED FROM MAIN-BODY OPERATION UNIT | 100, 101, 102 | 1 |
| | | | | 2 |
| BOX B | b34567 | OPENED FROM MAIN-BODY OPERATION UNIT | 103, 104, 105 | 3 |
| | | | | 4 |
| BOX C | cc7654 | OPENED FROM EXTERNAL APPARATUS | NONE | 5 |
| | | | | 6 |
| BOX D | dd9876 | CLOSED | NONE | 7 |
| | | | | 8 |

DISPLAY INFORMATION ← → NON-DISPLAY INFORMATION

FIG. 12

| JOB ID | CONFIDENTIAL FILE NAME | USER NAME | OPERATION MODE | NUMBER OF PAGES | NUMBER OF COPIES |
|---|---|---|---|---|---|
| 1 | FILE A1 | UserA | PRINTER | 5 | 1 |
| 2 | FILE A2 | UserA | PRINTER | 6 | 1 |
| 3 | FILE B1 | UserB | PRINTER | 7 | 1 |
| 4 | FILE B2 | UserB | PRINTER | 8 | 1 |
| 5 | FILE C1 | UserC | PRINTER | 9 | 1 |
| 6 | FILE C2 | UserC | PRINTER | 2 | 1 |
| 7 | FILE D1 | UserD | PRINTER | 1 | 1 |
| 8 | FILE D2 | UserD | PRINTER | 1 | 1 |

NON-DISPLAY INFORMATION

DISPLAY INFORMATION

FIG. 13

| JOB ID | CONFIDENTIAL BOX NAME | FILE NAME (DISPLAY ACCORDING TO CONDITION) | USER NAME | OPERATION MODE | NUMBER OF PAGES | STATE |
|---|---|---|---|---|---|---|
| 1 | BOX A | FILE A1 | UserA | PRINTER | 5 | IN MIDDLE OF OUTPUT |
| 10 | NONE | FILE NORMAL 1 | UserD | COPY | 1 | WAITING |
| 3 | BOX B | FILE B1 | UserB | PRINTER | 7 | WAITING |
| 5 | BOX C | FILE C1 | UserC | PRINTER | 9 | WAITING |

NON-DISPLAY INFORMATION | DISPLAY INFORMATION

FIG. 15

| JOB ID | CONFIDENTIAL BOX NAME | FILE NAME (DISPLAY ACCORDING TO CONDITION) | USER NAME | OPERATION MODE | NUMBER OF PAGES | OUTPUT HISTORY |
|---|---|---|---|---|---|---|
| 100 | BOX A | FILE A100 | UserA | PRINTER | 5 | END |
| 110 | NONE | FILE C100 | UserC | COPY | 1 | END |
| 103 | BOX B | FILE B100 | UserD | PRINTER | 1 | END |
| 102 | BOX A | FILE A101 | UserE | PRINTER | 1 | END |

NON-DISPLAY INFORMATION | DISPLAY INFORMATION

| MECHANICAL STATE | JOB LIST | READ | COPY | SCAN |
|---|---|---|---|---|

OUTPUT JOB HISTORY LIST IS DISPLAYED

| DEVELOPMENT STATUS | CONFIDENTIAL JOB | OUTPUT RESERVATION JOB | OUTPUT HISTORY | NO-OUTPUT HISTORY |
|---|---|---|---|---|

[ DETAIL ]

| FILE NAME | USER NAME | MODE | NUMBER OF PAGES | STATE |
|---|---|---|---|---|
| ********  | UserA | PRINTER | 5 | END |
| FILE C100 | UserC | COPY | 1 | END |
| ******** | UserD | PRINTER | 1 | END |
| ******** | UserE | PRINTER | 1 | END |
|  |  |  |  |  |
|  |  |  |  |  |
|  |  |  |  |  |

Figure 17:
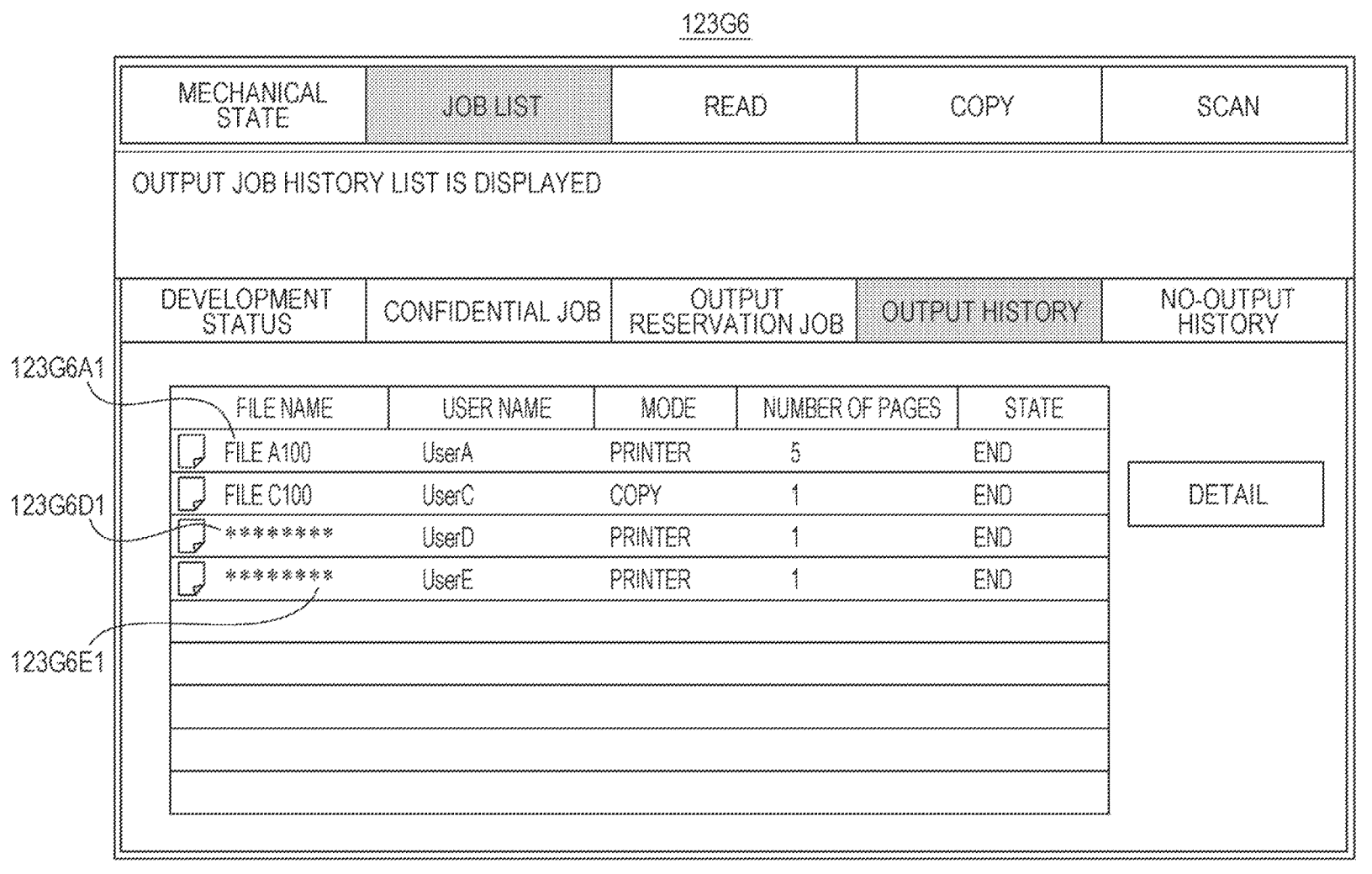

| MECHANICAL STATE | JOB LIST | READ | COPY | SCAN |
|---|---|---|---|---|

OUTPUT JOB HISTORY LIST IS DISPLAYED

| DEVELOPMENT STATUS | CONFIDENTIAL JOB | OUTPUT RESERVATION JOB | OUTPUT HISTORY | NO-OUTPUT HISTORY |
|---|---|---|---|---|

DETAIL

| FILE NAME | USER NAME | MODE | NUMBER OF PAGES | STATE |
|---|---|---|---|---|
| FILE A100 | UserA | PRINTER | 5 | END |
| FILE C100 | UserC | COPY | 1 | END |
| ******** | UserD | PRINTER | 1 | END |
| ******** | UserE | PRINTER | 1 | END |

| JOB ID | CONFIDENTIAL BOX NAME | FILE NAME (DISPLAY ACCORDING TO CONDITION) | USER NAME | NO-OUTPUT HISTORY |
|---|---|---|---|---|
| 100 | BOX A | FILE A100 | UserA | JOB CANCEL |
| 110 | NONE | FILE C100 | UserC | OVER USER LIMIT |
| 103 | BOX B | FILE B100 | UserD | OVER STORAGE NUMBER |
| 102 | BOX A | FILE A101 | UserE | OVER SECTION LIMIT |

NON-DISPLAY INFORMATION | DISPLAY INFORMATION

| MECHANICAL STATE | JOB LIST | READ | COPY | SCAN |

NO-OUTPUT JOB HISTORY LIST IS DISPLAYED

| DEVELOPMENT STATUS | CONFIDENTIAL JOB | OUTPUT RESERVATION JOB | OUTPUT HISTORY | NO-OUTPUT HISTORY |

| FILE NAME | USER NAME | CAUSE OF NO-OUTPUT |
|---|---|---|
| ******** | UserA | JOB CANCEL |
| FILE C100 | UserC | OVER USER LIMIT |
| ******** | UserD | OVER STORAGE NUMBER |
| ******** | UserE | OVER SECTION LIMIT |

| MECHANICAL STATE | JOB LIST | READ | COPY | SCAN |
|---|---|---|---|---|

NO-OUTPUT JOB HISTORY LIST IS DISPLAYED

| DEVELOPMENT STATUS | CONFIDENTIAL JOB | OUTPUT RESERVATION JOB | OUTPUT HISTORY | NO-OUTPUT HISTORY |
|---|---|---|---|---|

| FILE NAME | USER NAME | CAUSE OF NO-OUTPUT |
|---|---|---|
| FILE A100 | UserA | JOB CANCEL |
| FILE C100 | UserC | OVER USER LIMIT |
| ******** | UserD | OVER STORAGE NUMBER |
| ******** | UserE | OVER SECTION LIMIT |

| JOB ID | CONFIDENTIAL BOX NAME | PASSWORD | FILE NAME (DISPLAY ACCORDING TO CONDITION) | USER NAME | NO-OUTPUT HISTORY |
|---|---|---|---|---|---|
| 100 | BOX A | a12345 | FILE A100 | UserA | JOB CANCEL |
| 110 | NONE | b34567 | FILE C100 | UserC | OVER USER LIMIT |
| 103 | BOX B | cc7654 | FILE B100 | UserD | OVER STORAGE NUMBER |
| 102 | BOX A | dd9876 | FILE A101 | UserE | OVER SECTION LIMIT |

Non-display information: JOB ID, CONFIDENTIAL BOX NAME, PASSWORD

Display information: FILE NAME, USER NAME, NO-OUTPUT HISTORY

FIG. 23
123G7

| MECHANICAL STATE | JOB LIST | READ | COPY | SCAN |

NO-OUTPUT JOB HISTORY LIST IS DISPLAYED.
IN CASE WHERE MASK OF CONFIDENTIAL PRINT JOB IS RELEASED,
PLEASE INPUT CONFIDENTIAL BOX NAME AND PASSWORD.

| DEVELOPMENT STATUS | CONFIDENTIAL JOB | OUTPUT RESERVATION JOB | OUTPUT HISTORY | NO-OUTPUT HISTORY |

123G7PW

CONFIDENTIAL BOX NAME: [      ]
PASSWORD: [      ]

| FILE NAME | USER NAME | CAUSE OF NO-OUTPUT |
|---|---|---|
| FILE A100 | UserA | JOB CANCEL |
| FILE C100 | UserC | OVER USER LIMIT |
| ******* | UserD | OVER STORAGE NUMBER |
| ******* | UserE | OVER SECTION LIMIT |

FIG. 26

| CONFIDENTIAL BOX NAME | PASSWORD | STATE | PAST JOB ID | CURRENT JOB ID |
|---|---|---|---|---|
| BOX A → BOX E | a12345 | OPENED FROM MAIN-BODY OPERATION UNIT | 100, 101, 102 | 1, 2 |
| BOX B | b34567 | CLOSED | 103, 104, 105 | 3, 4 |
| BOX C | cc7654 | CLOSED | NONE | 5, 6 |
| BOX D | dd9876 | CLOSED | NONE | 7, 8 |

DISPLAY INFORMATION | NON-DISPLAY INFORMATION

FIG. 27

| JOB ID | CONFIDENTIAL BOX NAME | PASSWORD | FILE NAME (DISPLAY ACCORDING TO CONDITION) | USER NAME | NO-OUTPUT HISTORY |
|---|---|---|---|---|---|
| 100 | BOX A → BOX E | a12345 | FILE A100 | UserA | JOB CANCEL |
| 110 | NONE | b34567 | FILE C100 | UserC | OVER USER LIMIT |
| 103 | BOX B | cc7654 | FILE B100 | UserD | OVER STORAGE NUMBER |
| 102 | BOX A → BOX E | dd9876 | FILE A101 | UserE | OVER SECTION LIMIT |

NON-DISPLAY INFORMATION | DISPLAY INFORMATION

IMAGE FORMING APPARATUS HAVING A CONFIDENTIAL BOX FUNCTION

The entire disclosure of Japanese Patent Application No. 2015-239553 filed on Dec. 8, 2015 including description, claims, drawings, and abstract are incorporated herein by reference in its entirety.

BACKGROUND OF THE INVENTION

Field of the Invention

The present invention relates to a technique that enables a print job stored in an area of a confidential box to be easily handled while securing confidentiality.

Description of the Related Art

In a case where a print process is performed, a user generates print data described in a page description language called a PDL by operating a predetermined program on a computer. In addition, the computer transmits the print data described in such a page description language to an image forming system including a print controller. An image forming apparatus performs a rasterizing process (also called a raster image process (RIP)) of print data by using a printer controller based on the print data transmitted from the computer, thereby generating image data in the form of a bit map. Then, in the image forming apparatus, data of a print job including the image data is transmitted from the printer controller to an image forming unit, and the image forming unit forms an image based on the data on a sheet.

In the image forming apparatus, there is a function called a box function, which enables various kinds of data to be stored in units of boxes and enables a process to proceed as is necessary. Furthermore, as such a box function, there is also a function called a confidential box that protects data using passwords. In such a case, print data is transmitted from the computer to a confidential box protected using a password. Then, a user opens the print data disposed inside the confidential box by inputting a password from an operation display unit of the image forming apparatus and can give various directions such as a print direction and the like.

Hereinafter, the sequence of image formation of a conventional print job using a confidential box will be described.

(1) A user generates a document (confidential document) having high confidentiality by using a computer.

(2) The user directs printing from the computer to an image forming apparatus and transmits print data to which a confidential box name and a password are assigned as a confidential print job.

(3) The image forming apparatus that has received the confidential print job generates image data in the form of a bit map by performing an RIP process. At this time, on a development status job list screen, since the print job is a confidential print job, a file name thereof is substituted with asterisks or the like and is displayed in a masked manner.

(4) When the RIP process is completed, the image forming apparatus automatically generates a confidential box and stores image data of the confidential print job in the confidential box.

(5) The user selects a confidential box from an operation display unit of the image forming apparatus and inputs a corresponding password, thereby opening the confidential box. In a confidential job list at this time, since the user inputs the password, the name (file name) of the print job is displayed not in a masked display but in a normal state.

(6) The user selects a confidential print job, presses an image formation output button, thereby directing image formation.

(7) The confidential print job is moved from the confidential job list to an output job reservation list. The output job reservation list is a list in which a confidential print job and other person's normal print jobs are displayed in a mixed state in a case where not only the confidential print job but also other persons' normal print jobs that are not confidential are present. At this time, the output job reservation list is public and has a possibility of being read by any other person, and accordingly, a file name of a confidential print job is displayed in a masked manner.

(8a) In a case where image formation output of the confidential print job normally ends, the confidential print job is moved from the output job reservation list to an output job history list. The output job history list is a list in which a confidential print job and other persons' normal print jobs are displayed in a mixed state in a case where not only the confidential print job but also other persons' normal print jobs that are not confidential are present. At this time, the output job history list is public and has a possibility of being read by the other persons, and accordingly, a file name of the confidential print job is displayed in a masked manner.

(8b) In a case where image formation output of the confidential print, job does not normally end, the confidential print job is moved from the output job reservation list to a no-output job history list. The no-output job history list is a list in which a confidential print job and other persons' normal print jobs are displayed in a mixed state in a case where not only the confidential print job but also other persons' normal print jobs that are not confidential are present. At this time, the no-output job history list is public and has a possibility of being read by the other persons, and accordingly, a file name of the confidential print job is displayed in a masked manner.

As above, when a user directs image formation for a confidential print job from a confidential box, the confidential job is deleted from the confidential box, and the print job is moved to a job list (the output job reservation list, the output job history list, or the no-output job history list) that is in a public state having the possibility of being read also by a person other than the user.

At this time, in the public job list, the confidential print job and the other normal print jobs are aligned to be displayed. For this reason, in order to secure security of the confidential print job, a file name of the confidential print job is displayed in a masked manner.

Meanwhile, while the confidentiality is maintained by displaying a confidential print job in a masked manner in the public job list, there is a problem in that a user handling the confidential print job does not know about his own print job.

For example, in a case where the user handles a plurality of confidential print jobs in parallel, a case where a different user handles a confidential print job at the same timing, or the like a state occurs in which individual confidential print job cannot be specified.

For handling the confidential print jobs as described above, countermeasures have been reviewed in JP 2006-163261 A and JP 2007-58543 A.

According to JP 2006-163261 A, a history and a status of a job having high confidentiality are configured not to be viewable for a person having a low security level, whereby the security of the job having high confidentiality is reinforced. However, the problem, that the history and the status of a job in a public list are not viewable also for the user of the job remains.

In addition, according to JP 2007-58543 A, in a configuration in which only one box for improving confidentiality is present, the display of a job list registered in the box is controlled using authentication information used for logging in a device. However, the problem that the history and the status of a job in a public list other than that registered in the confidential box are not viewable also for a user of the job remains.

SUMMARY OF THE INVENTION

The present invention has been made in consideration of the problems described above, and an object thereof is to realize an image forming apparatus enabling a user to perceive the state of his own job in a public display list while securing confidentiality of a confidential print job.

That is, the problems are solved by the following inventions.

(1) To achieve the abovementioned object, according to an aspect, an image forming apparatus reflecting one aspect of the present invention comprises: an image forming unit configured to form an image on a sheet; a storage unit configured to store a print job while managing a storage area in units of boxes; an operation display unit configured to display various kinds of information and receive various directions; and a control unit configured to control image formation performed by the image forming unit based on image data in units of print jobs, storage performed by the storage unit, and input and display performed by the operation display unit, wherein the control unit is configured to have: a confidential box function storing the print job in an area of a confidential box that is managed by assigning a password to a box and enabling a direction of image formation output for the print job by accompanying input of the password; a status managing function managing a status of image formation for the print job for which the image formation output is directed; an information displaying function displaying various kinds of information in the operation display unit in accordance with the confidential box function and the status managing function; and an image forming function forming an image by using the image forming unit based on the image data in units of the print jobs, and the control unit is configured to control a file name of the print job to be displayed in the operation display unit in a masked state when the status of the print job stored in the confidential box is managed and control the file name of the print job to be displayed in the operation display unit in a mask released state in a case where the password corresponding to the confidential box is input to the operation display unit when the status is managed for the print job stored in the confidential box.

(2) To achieve the abovementioned object, according to an aspect, an image forming apparatus reflecting one aspect of the present invention comprises: an image forming unit configured to form an image on a sheet; a storage unit configured to store a print job while managing a storage area in units of boxes; an operation display unit configured to display various kinds of information and receive various directions; and a control unit configured to control image formation performed by the image forming unit based on image data in units of print jobs, storage performed by the storage unit, and input and display performed by the operation display unit, wherein the control unit is configured to have: a confidential box function storing the print job in an area of a confidential box that is managed by assigning a password to a box and enabling a direction of image formation output for the print job by accompanying input of the password; a status managing function managing a status of image formation for the print job for which the image formation output is directed; an information displaying function displaying various kinds of information in the operation display unit in accordance with the confidential box function and the status managing function; and an image forming function forming an image by using the image forming unit based on the image data in units of the print jobs, and the control unit is configured to control a file name of the print job to be displayed in the operation display unit in a masked state when the status of the print job stored in the confidential box is managed and control the file name of the print job to be displayed in the operation display unit in a mask released state for a fixed period in a case where the password corresponding to the confidential box is input when the status is managed for the print job stored in the confidential box.

(3) In the above Item. 1, the control unit is preferably configured to control the file name of the print job relating to the confidential box to be displayed in the operation display unit in a mask released state for a fixed period after input of the password corresponding to the confidential box from one part other than the operation display unit.

(4) In the above Items. 2 and 3, the fixed period is preferably a fixed time that is determined in advance or a time until a reset operation is performed in the operation display unit.

(5) In the above Items. 1 to 4, the control unit is preferably configured to perform display in a state in which the print job and a separate print job not relating to the confidential box are mixed as display performed by the operation display unit at the time of managing the status.

(6) In the above Items. 1 to 5, the control unit is preferably configured to manage the print job and the confidential box in association with each other for the print job stored in the confidential box and control the masked state and the mask released state of the file name of the print job.

(7) In the above Items. 1 to 6, a plurality of the confidential boxes are preferably arranged, and in a case where the password corresponding to each of the plurality of the confidential boxes is input, the control unit, when the status is managed, preferably controls file names of all of a plurality of the print jobs corresponding to a plurality of the confidential boxes to which the passwords are input to be displayed in the operation display unit in the mask released state.

(8) In the above Items. 1 to 7, a plurality of the print jobs are preferably stored in the same confidential box, and in a case where the password of the confidential box is input, the control unit, when the status is managed, is preferably configured to control file names of all of the plurality of the print jobs stored in the same confidential box to be displayed in the operation display unit in the mask released state.

(9) In the above Items. 1 to 8, in a case where the password of the confidential box is changed to a new password, the control unit is preferably configured to check input of the new password and control the mask released state.

(10) In the above Items. 1 to 9, the control unit is preferably configured to store a relation between the confidential box and the password in the storage unit and, in a case where the status is managed after deletion of the confidential box, in the management of the status, request input of the password corresponding to the deleted confidential box, check the input of the password corresponding to the deleted confidential box, and control the mask released state.

(11) In the above Items. 1 to 10, the control unit is preferably configured to store a relation between the confidential box and the password in the storage unit and, in a case where a direction of image formation is made by inputting the password corresponding to the confidential box from an apparatus other than the image forming apparatus, in the management of the status, request input of the password corresponding to the confidential box, check the input of the password corresponding to a deleted confidential box to the operation display unit, and control the mask released state.

(12) In the above Items. 10 and 11, the control unit, in the management of the status, is preferably configured to display a screen requesting input of the password required for controlling the mask released state in the operation display unit.

(13) In the above Items. 1 to 12, in a case where the print job in the middle of execution is stopped due to an error, the control unit is preferably configured to control display of file names displayed in the operation display unit in the mask released state to be returned to the masked state.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a schematic diagram that illustrates an example of display of an operation display unit of an image forming apparatus according to an embodiment of the present invention;

FIG. 5 is a schematic diagram that illustrates an example of display of an operation display unit of an image forming apparatus according to an embodiment of the present invention;

FIG. 7 is a schematic diagram that illustrates an example of display of an operation display unit of an image forming apparatus according to an embodiment of the present invention;

FIG. 9 is a schematic diagram that illustrates an example of display of an operation display unit of a conventional image forming apparatus;

FIG. 10 is a schematic diagram, that illustrates an example of display of an operation display unit of an image forming apparatus according to an embodiment of the present invention;

FIG. 12 is a schematic diagram that illustrates an example of a table in an image forming apparatus according to an embodiment of the present invention;

FIG. 13 is a schematic diagram that illustrates an example of a table in an image forming apparatus according to an embodiment of the present invention;

FIG. 15 is a schematic diagram that illustrates an example of a table in an image forming apparatus according to an embodiment of the present invention;

FIG. 16 is a schematic diagram that illustrates an example of display of an operation display unit of a conventional image forming apparatus;

FIG. 17 is a schematic diagram that illustrates an example of display of an operation display unit of an image forming apparatus according to an embodiment of the present invention;

FIG. 19 is a schematic diagram that illustrates an example of a table in an image forming apparatus according to an embodiment of the present invention;

FIG. 20 is a schematic diagram that illustrates an example of display of an operation display unit of a conventional image forming apparatus;

FIG. 21 is a schematic diagram that illustrates an example of a table in an image forming apparatus according to an embodiment of the present invention;

FIG. 22 is a schematic diagram that illustrates an example of a table in an image forming apparatus according to an embodiment of the present invention;

FIG. 23 is a schematic diagram that illustrates an example of display of an operation display unit of an image forming apparatus according to an embodiment of the present invention;

FIG. 26 is a schematic diagram that illustrates an example of a table in an image forming apparatus according to an embodiment of the present invention; and FIG. 27 is a schematic diagram that illustrates an example of a table in an image forming apparatus according to an embodiment of the present invention.

DESCRIPTION OF THE PREFERRED EMBODIMENTS

Hereinafter, an embodiment of the present invention will be described in detail with reference to the drawings. However, the scope of the invention is not limited to the illustrated examples.

Configuration of Image Forming Apparatus

Figure 1:
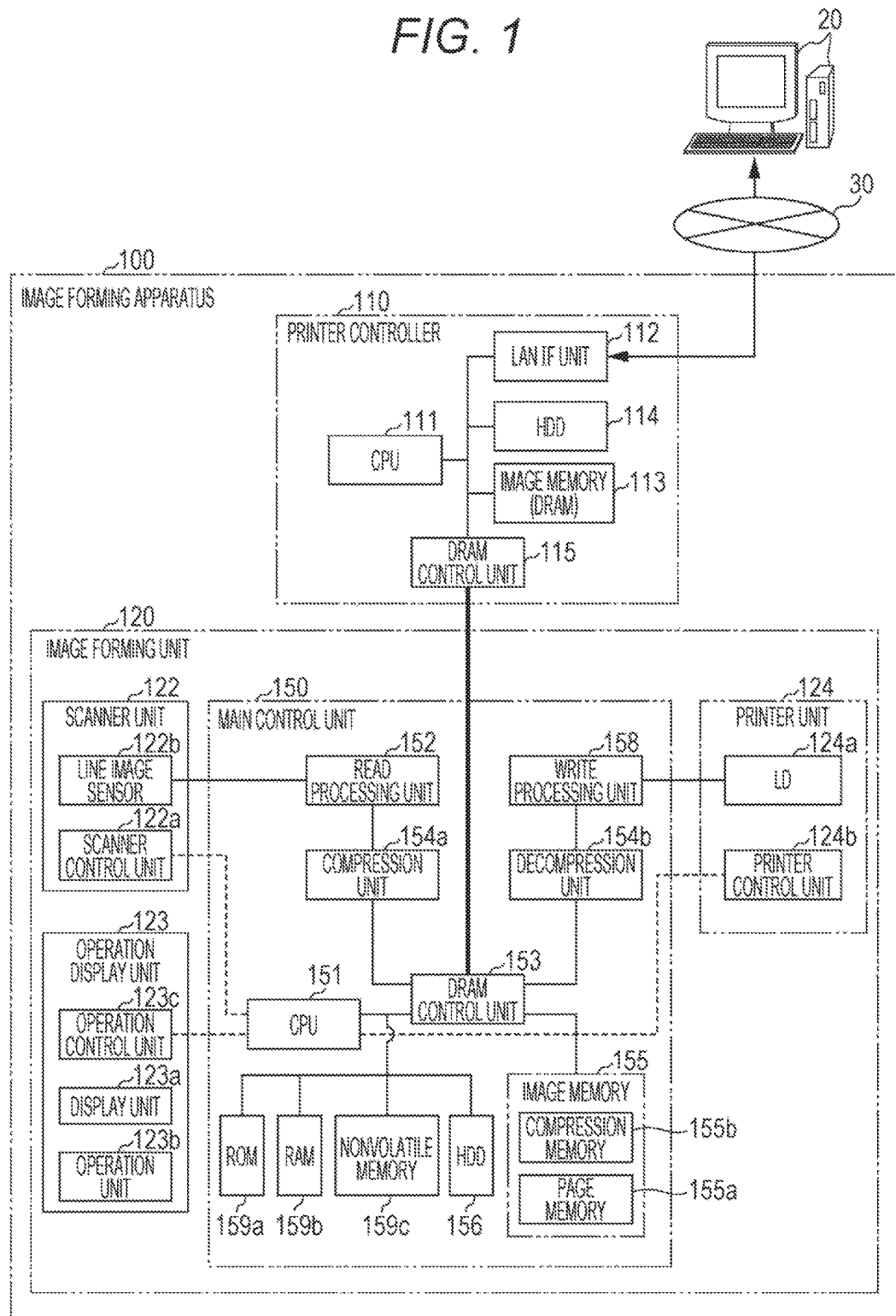
FIG. 1 is a block diagram that illustrates the configuration of an image forming apparatus according to an embodiment of the present invention.

FIG. 1 illustrates the system configuration of an image forming apparatus 100 according to a first embodiment of the present invention.

The image forming apparatus 100 is configured to include a printer controller 110 and an image forming unit 120. The printer controller 110 is connected to an information processing apparatus 20 such as a personal computer (PC) through a network 30 such as a local area network (LAN) and has a function of performing a process (RIP process) of generating image data by performing a rasterizing process of a print job transmitted from the information processing apparatus 20. Here, the image data is image data in the form of a bit map used for image formation.

The printer job received by the printer controller 110 from the information processing apparatus 20 includes print data representing characters or graphics as code data or vector data, for example, print data described in a page description language (PDL), and the rasterizing process (RIP process) is a process of developing print data configured by code data or vector data into image data in the form of a bit map.

The image forming unit 120 has an image formation output function of receiving data (hereinafter, referred to as job data) of a print job including image data from the printer controller 110 and forming a color image or a monochrome image on a recording sheet based on the image data, and outputting the formed image. Here, the image forming unit 120 is configured as a so-called digital color multifunction device having a copy function of optically reading a document and forming a copied image thereof on a recording sheet and the like in addition to the image formation output function.

The printer controller 110 includes: a central processing unit (CPU) 111 that overall controls the operation of the printer controller 110; a LAN-IF unit 112 that has a communication function for connection to the network 30; an image memory 113 that stores image data generated by the RIP process and the like; a hard disk device (HDD) 114 that stores print data received from the network 30, intermediate data generated in the process of the RIP process, and the like; and a DRAM control unit 115 that has a data read/write function for the image memory 113 and a function of transmitting/receiving various kinds of data to/from the image forming unit 120.

In addition, although not illustrated in the drawing, a read only memory (ROM) that stores a program read and executed by the CPU 111 and fixed data, a work memory that is used for temporarily storing various kinds of data at the time of executing a program using the CPU 111, and the like are connected to the CPU 111.

Figure 2:
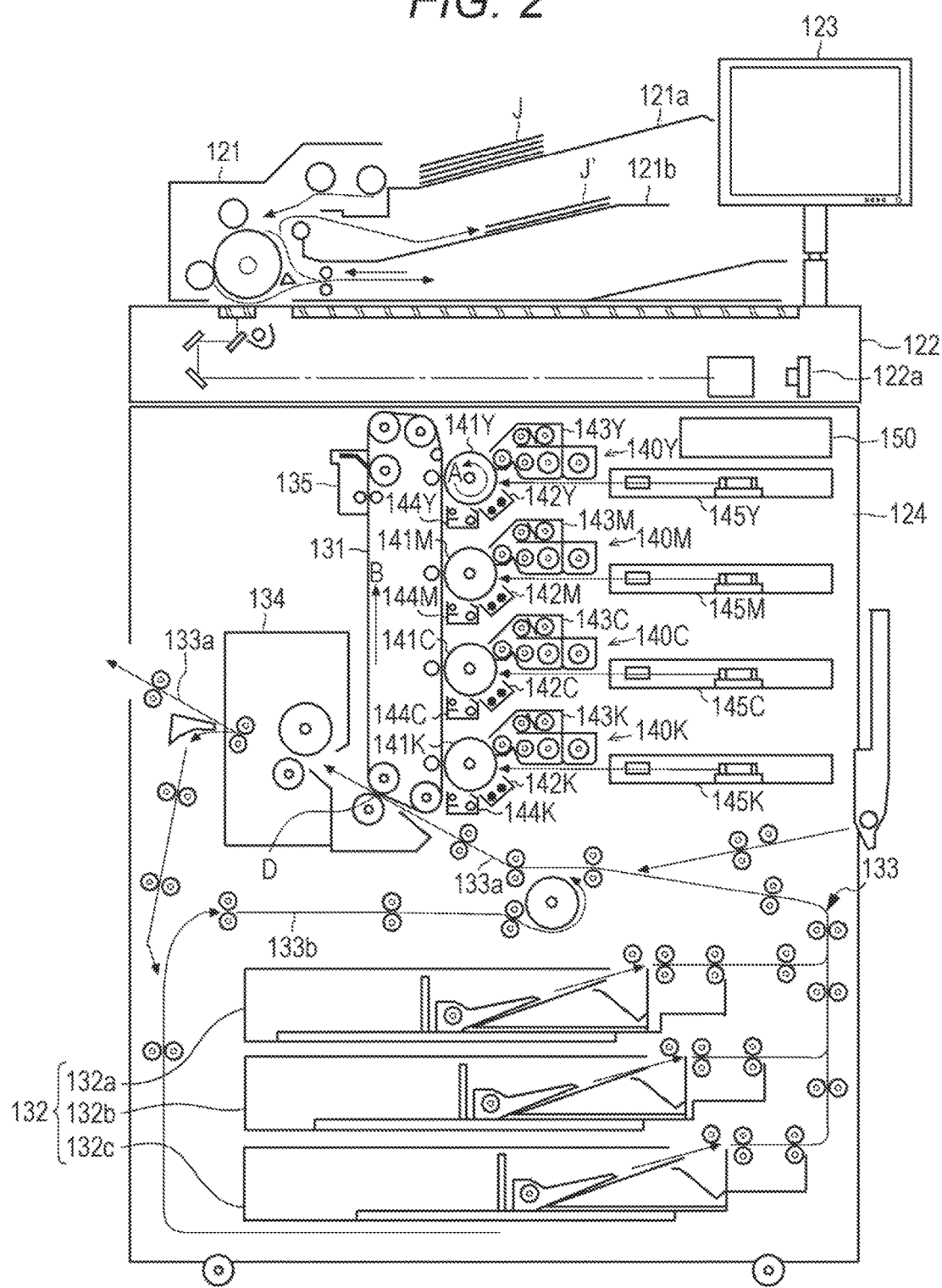
FIG. 2 is a configuration diagram that illustrates the configuration of an image forming apparatus according to an embodiment of the present invention.

FIG. 2 illustrates the schematic mechanical configuration of the image forming unit 120. The image forming unit 120 is configured to include: a scanner unit 122 that includes an automatic document feeding device 121; an operation display unit 123; a printer unit 124 that forms an image on a recording sheet and outputs the formed image; and a main control unit 150.

The automatic document feeding device 121 has a function of feeding documents J loaded in a document loading tray 121a to a reading position of the scanner unit 122 one by one and discharging the document J' that has been read to a sheet discharge tray 121b.

The scanner unit 122 has a function of optically reading a document J in colors or monochrome and acquiring image data corresponding thereto. The scanner unit 122 includes: an exposure scan unit that is formed by a light source and a mirror; a color line image sensor 122a that receives reflection light reflected from a document and outputs an electric signal corresponding to the light intensity thereof for each color; various mirrors and condensing lenses guiding reflection light reflected from a document to the line image sensor 122a; and the like. The scanner unit 122 can read a document in a state in which the document is placed on a platen glass in addition to a moving reading mode in which a document is read while relatively moving the document with respect to a reading position by conveying the document using the automatic document feeding device 121.

The printer unit 124 includes a tandem-type image forming unit and includes: an intermediate transfer belt 131 having an endless circular shape; a plurality of image forming units 140Y, 140M, 140C, and 140K each forming a toner image of a single color on the intermediate transfer belt 131; a sheet feeding unit 132 that feeds a recording sheet on which an image is to be formed; a conveyance unit 133 that conveys the fed recording sheet; and a fixing device 134.

The image forming unit 140Y forms an image of a yellow (Y) color on the intermediate transfer belt 131, the image forming unit 140M forms an image of a magenta (M) color on the intermediate transfer belt 131, the image forming unit 140C forms an image of a cyan (C) color on the intermediate transfer belt 131, and the image forming unit 140K forms an image of a black (K) color on the intermediate transfer belt 131.

The image forming unit 140Y includes a photosensitive body 141Y as a cylindrical electrostatic latent image carrier having an electrostatic latent image formed on the surface thereof and a charging device 142Y, a developing device 143Y, and a cleaning device 144Y arranged on the periphery thereof. In addition, the image forming unit 140Y includes a laser unit 145Y that is configured by a laser diode, a polygon mirror, various lenses and mirrors, and the like.

The photosensitive body 141Y is driven by a drive unit not illustrated in the drawing and rotates in a fixed direction (the direction of arrow A in the drawing), and the charging device 142Y uniformly charges the photosensitive body 141Y. The laser unit 145Y scans the photosensitive body 141Y by using a laser beam that is turned on/off in accordance with image data of the yellow color, thereby forming an electrostatic latent image on the surface of the photosensitive body 141Y. The developing device 143Y develops the electrostatic latent image formed on the photosensitive body 141Y by using toner of the yellow color. A toner image formed on the surface of the photosensitive body 141Y is transferred onto the intermediate transfer belt 131 at a portion brought into contact with the intermediate transfer belt 131. The cleaning device 144Y has a function of removing toner remaining on the surface of the photosensitive body 141Y after the transfer by scraping the toner using a blade or the like and collecting the toner.

Each of the image forming units 140M, 140C, and 140K has a different color of toner and has the same configuration as the image forming unit 140Y except that a laser beam of a laser unit is turned on/off in accordance with image data corresponding to the color, and thus, description thereof will not be presented. In the drawing, a reference sign having a same number and using a symbol M (corresponding to the M color), C (corresponding to the C color), or K (corresponding to the K color) representing the color as the subscript instead of "Y" is assigned to an element of the same configuration having a color difference.

The intermediate transfer belt 131 is wound so as to be bridged over a plurality of rollers and orbits in the direction of arrow B illustrated in the drawing during image formation. In the process of orbiting, images (toner images) of colors are formed on the intermediate transfer belt 131 in an overlapping manner by the image forming units 140Y, 140M, 140C, and 140K in order of (Y), (M), (C), and (K), whereby a color image is composed. This color image is transferred, onto a recording sheet from the intermediate transfer belt 131 at a secondary transfer position D.

On the downstream side of the secondary transfer position D in the orbiting direction, a belt cleaning device 135 used for removing toner remaining on the intermediate transfer belt 131 after transfer is disposed.

The sheet feeding unit 132 includes a plurality of sheet feeding cassettes 132a to 132c that house recording sheets provided for image formation and has a function of sending out recording sheets from selected one of the sheet feeding cassettes 132a to 132c to the conveyance unit 133 one sheet each time. The conveyance unit 133 includes a normal path 133a causing a recording sheet delivered from the sheet feeding unit 132 to pass through the secondary transfer position D and the fixing device 134 and be discharged to a post processing device or a sheet discharging tray not illustrated in the drawing and a reversing path 133b causing a recording sheet passing through the fixing device 134 to be reversed and then to join the normal path 133a again on the upstream side of the secondary transfer position D, which corresponds to double-side printing.

The post-processing device is a device having a function of folding a recording sheet, binding and stapling a plurality of recording sheets, or punching a hole or the like and is connected to a later stage of the image forming unit 120. The content of the processing performed by the post-processing device is designated using a control command output from the main control unit 150 of the image forming unit 120 to the post-processing device.

Referring back to FIG. 1, the electrical configuration of the image forming unit 120 will be described. The image forming unit 120 is configured by connecting the scanner unit 122, the printer unit 124, and the operation display unit 123 to the main control unit 150 that overall controls the operation of the image forming unit 120.

The scanner unit 122, in addition to the line image sensor 122a illustrated in FIG. 2, includes a scanner control unit 122b that controls the overall operation of the scanner unit 122.

The printer unit 124, in addition to each laser diode (LD) 124a that is turned on/off in accordance with image data, includes a printer control unit 124b that controls the operations of the intermediate transfer belt 131, the image forming units 140Y, 140M, 140C, and 140K, the sheet feeding unit 132, the conveyance unit 133, the fixing device 134, and the like. Furthermore, although not illustrated in the drawing, a motor, a solenoid, a sensor, and the like used for operating the intermediate transfer belt 131, the image forming units 140Y, 140M, 140C, and 140K, the sheet feeding unit 132, the conveyance unit 133, and the like are connected to the printer control unit 124b.

The operation display unit 123 has a function of displaying various setting screens and operation screens, a job selection screen 170, a job editing screen 180, and an output job reservation list screen 190 to be described later, and the like, a function of displaying various kinds of guide information, notifications, warnings, or the like for an operator, and a function of receiving various setting/selection operations, an editing operation, and an output direction (image formation start direction) from an operator. The operation display unit 123 is configured to include: a display unit 123a that is formed by a liquid crystal display; an operation unit 123b that is formed by touch switches arranged on the screen thereof and the other switches; and an operation control unit 123c that controls the display unit 123a and the operation unit 123b.

In addition, each of the scanner control unit 122b, the operation control unit 123c, and the printer control unit 124b is configured by a circuit having a central processing unit (CPU), a read only memory (ROM), a random access memory (RAM) as its main parts and performs various control processes in accordance with a program stored in the ROM.

The main control unit 150 achieves the function of overall controlling the operation of the image forming unit 120 and is configured to include: a read processing unit 152; a dynamic random access memory (DRAM) control unit 52; a compression IC 154a; a decompression IC 154b; an image memory 155 that is configured by a semiconductor memory; a write processing unit 158; a CPU 151; a ROM 159a; a RAM 159b; a nonvolatile memory 159c; a hard disk device 156 (also referred to as an HDD), and the like.

The CPU 151 has a function of controlling the overall operation of the image forming unit 120. In the ROM 159a, a program, various kinds of fixed data, and the like are stored, and the CPU 151 operates according to the program stored in the ROM 159a. The RAM 159b is used as a work memory that temporarily stores various kinds of data when the CPU 151 executes a program. The nonvolatile memory 159c is a memory in which user data, system, data, various setting values, and the like to be stored also after power-off are stored. A print queue to be described later is generated and stored, in the RAM 159b or the nonvolatile memory 159c.

The read processing unit 152 has a function of performing an enlargement process, mirror image processing, an error diffusion process, and the like for image data output by the scanner unit 122.

The DRAM control unit 153 performs timing control of read, write, and refresh for the image memory 155 formed by a dynamic RAM and timing control at the time of compressing image data and storing the compressed image data in the compression memory 155b or reading compressed image data from the compression memory 155b and decompressing the read compressed image data, and the like. In addition, the DRAM control unit 153 is connected to the DRAM control unit 115 of the printer controller 110 through a peripheral component interconnect (PCI) bus 104 and has a function of transmitting/receiving various kinds of data to/from the printer controller 110 through the PCI bus 104.

The compression IC 154a compresses image data, and the decompression IC 154b has a function of decompressing the compressed image data (compression image data) to original image data. The image memory 155 used for a function as a page memory 155a capable of storing uncompressed image data in units of pages and the compression memory 155b storing compression image data, and the like.

In the hard disk device 156, data (job data) of a print job received from the printer controller 110 and the like are stored and saved.

The write processing unit 158 has a function of outputting signals used for turning on/off the laser diodes of the color laser units 145Y, 145M, 145C, and 145K at timing according to the operation of the printer unit 124 in accordance with image data that is read from the compression memory 155b and is decompressed.

Here, a state is illustrated in which the printer controller 110 is built into the inside of the image forming apparatus 100. In a case where the printer controller 110 is disposed outside the image forming apparatus 100, data transmission/reception between the printer controller 110 and the image forming unit 120 is performed using an interface appropriate thereto.

Operation of Image Forming Apparatus

Here, the overall operation of image formation performed by the image forming apparatus according to this embodiment will be described with reference to a flowchart illustrated in FIG. 3, and the operations of featured parts of this embodiment will be described with reference to flowcharts illustrated in FIGS. 8, 14, and 18.

Overall Operation

Figure 3:
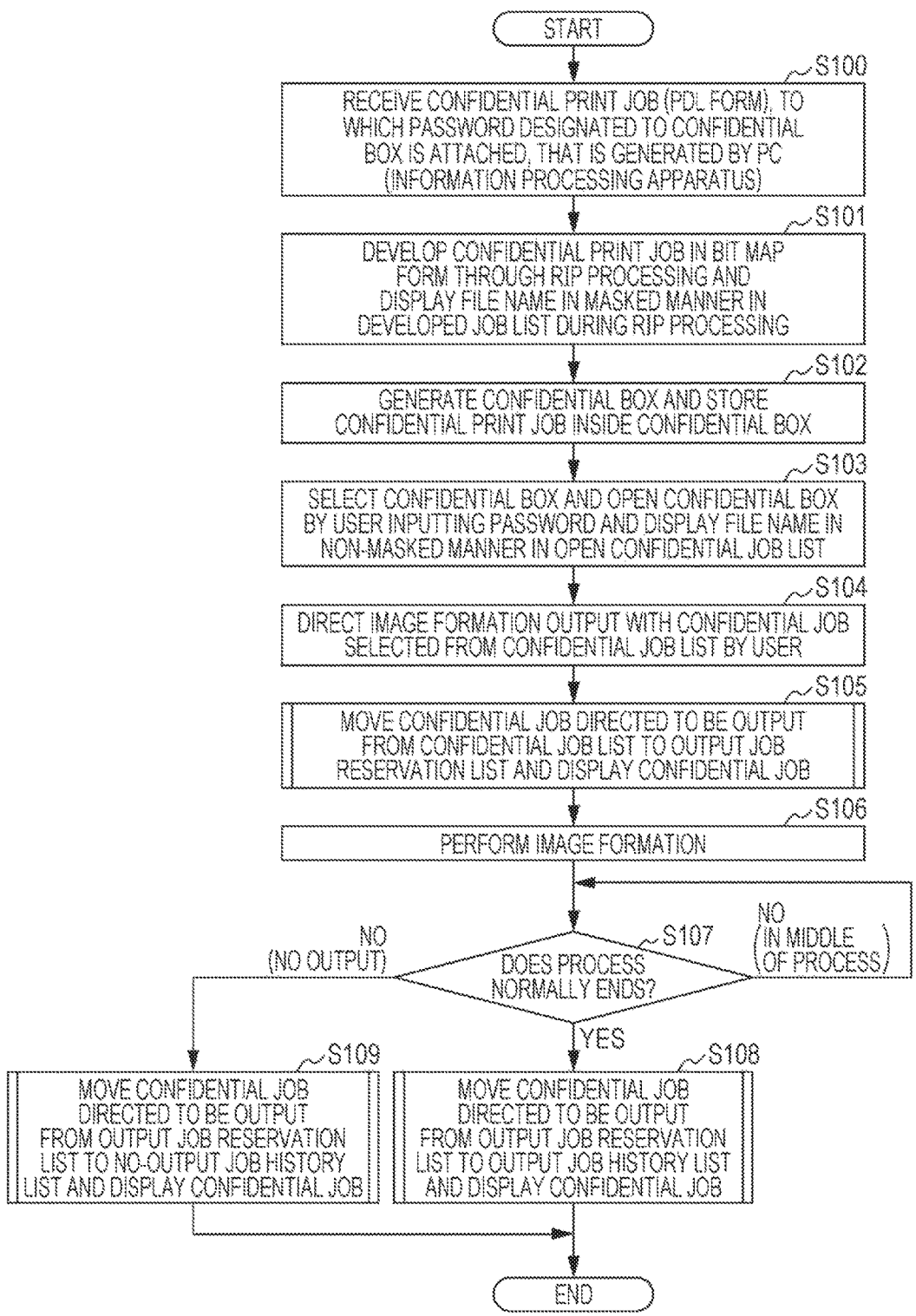
FIG. 3 is a flowchart that illustrates the overall operation of an image forming apparatus according to an embodiment of the present invention.

FIG. 3 illustrates the overall flow of a printing process performed by the image forming apparatus 100.

The information processing apparatus 20 generates a confidential print job (PDL form) designating a confidential box to which a password is attached. Then, the information processing apparatus 20 transmit the confidential print job (PDL form) designating the confidential box to which the password is attached to the printer controller 110 through a printer driver. The image forming apparatus 100 receives the confidential print job (PDL form) designating the confidential box to which the password is attached (step S100 illustrated in FIG. 3).

In addition, while the information processing apparatus 20 can generate a normal print job (PDL form) that is not confidential and transmit the generated normal print job to the image forming apparatus 10, here, description of the confidential print job will be presented.

The printer controller 110 of the image forming apparatus 100 that has received the print job from the information processing apparatus 20 performs a RIP process (rasterizing process) for print data of the received confidential print job, thereby generating image data in the form of a bit map (step S101).

During this RIP process, the CPU 111 and the CPU 151 display a file name of the target confidential print job in a masked state (a state in which the file name is substituted with asterisks (*)) on a development status job list screen 123G1 (FIG. 4) representing being in the middle of the RIP process in the operation display unit 123 (see 123G1a on the development status job list screen 123G1 illustrated in FIG. 4).

On this development status job list screen 123G1, the status is displayed not only when the RIP process is performed for a print job transmitted from the information, processing apparatus 20 but also when a re-RIP process is pier formed for a print job for which a parameter change is input in the operation display unit 123. On this development status job list screen 123G1, by selecting a print job and then selecting a tab of "Delete", the print job can be deleted.

When the RIP process performed by the printer controller 110 is completed, the CPU 151 of the main control unit 150 that has received the confidential print job in the form of a developed bit map from the printer controller 110 generates a confidential box as a storage area in units of boxes inside the HDD 156 as a storage unit and loads (stores) the confidential print job inside the confidential box (step S102 illustrated in FIG. 3).

Then, the CPU 151 displays generated confidential boxes as a box display screen 123G2 in the operation display unit 123 as illustrated in FIG. 5. On the box display screen 123G2 illustrated in FIG. 5, two boxes 123G2a and 123G2b are illustrated.

A box function is a function of storing print jobs by managing the storage area arranged inside the HDD 156 in units of boxes. In addition, a confidential box function is a function enabling image formation output of a confidential print job to be directed by storing a confidential print job in an area of a confidential box that is managed with a password assigned to the box and accompanying input of the password.

A user can select a desired confidential box for which image formation is performed on the box display screen 123G2 (FIG. 5) of the operation display unit 123. Here, on the box screen 123G2, a box A (123G2a illustrated in FIG. 5) as a confidential box and a box B (123G2b illustrated in FIG. 5) as a confidential box can be selected. Here, it is assumed that the user selects the box A (123G2a) on the box screen 123G2.

Figure 6:
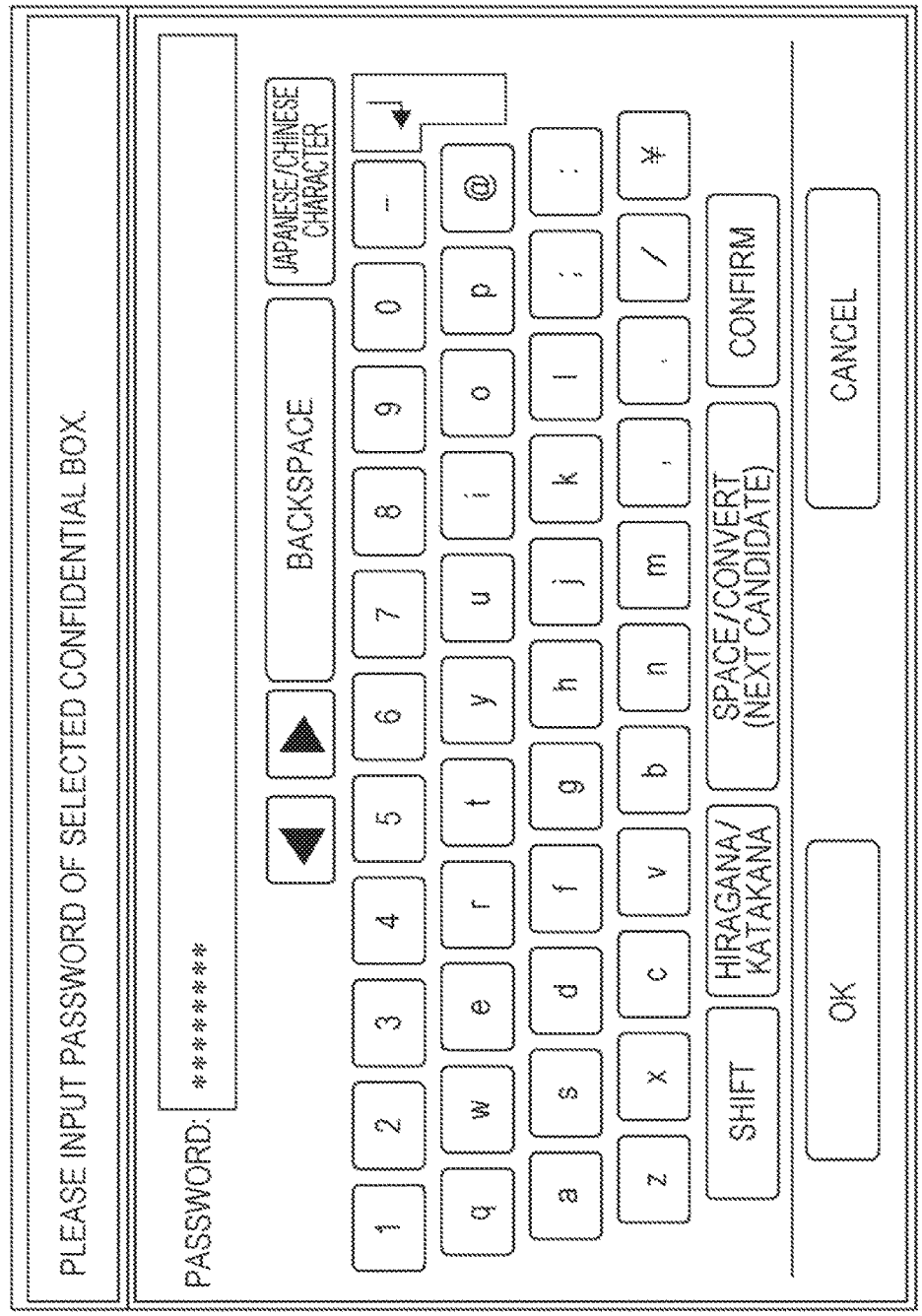
FIG. 6 is a schematic diagram that illustrates an example of display of an operation display unit of an image forming apparatus according to an embodiment of the present invention.

Then, the CPU 151 displays a password input screen 123G3 in the operation display unit 123 as illustrated in FIG. 6. The user inputs a password, which is assigned to the confidential box selected on the box screen 123G2, on the password input screen 123G3.

In a case where the password input on the password input screen 123G3 is correct, the CPU 151 displays print jobs stored in the box A as the confidential box selected by the user in the operation display unit 123 as a confidential job list screen 123G4 illustrated in FIG. 7. Since the password is input when the box A is open, file names are in a mask-released state on the confidential job list screen 123G4 (step S103 illustrated in FIG. 3).

On the confidential job list screen 123G4 illustrated in FIG. 7, a file A1 and a file A2 are displayed as confidential print jobs.

In addition, on this confidential job list screen 123G4, a state is illustrated in which the file A1 of the confidential print job is selected (a gray portion of 123G4A illustrated in FIG. 7).

In the state in which the confidential print job is selected in this way, by pressing a button Delete 1 (123G4d illustrated in FIG. 7), a confidential box to which the selected confidential print job belongs can be directed to be deleted. In addition, in the state in which the confidential print job is selected, by pressing a button Delete 2 (123G4e illustrated in FIG. 7), the selected confidential print job can be directed to be deleted. Furthermore, in the state in which the confidential print job is selected, by pressing a button Edit 1 (123G4b illustrated in FIG. 7), the screen is returned to the password input screen 123G3 illustrated in FIG. 6, and the password of the confidential box to which the selected confidential print job belongs can be changed. In addition, in the state in which the confidential print job is selected, by pressing a button Edit 2 (123G4c illustrated in FIG. 7), a setting change for the selected confidential print job can be directed.

In addition, in this embodiment, in the state in which the confidential print job is selected, by pressing a button Output (123G4a illustrated in FIG. 7), the user directs image formation for the selected confidential print job (step S104 illustrated in FIG. 3).

The CPU 151 that has received the direction of image formation for a confidential print job moves the corresponding confidential print job (the file A1 and the file A2 illustrated in FIG. 7) from the confidential job list screen 123G4 (FIG. 7) to an output job reservation list screen 123G5 to be described later and displays a state representing being in the middle of output of image formation or waiting for the output (step S105 illustrated in FIG. 3).

In addition, the CPU 151 that has received the direction of image formation for the confidential print job directs the printer control unit 124b disposed inside the printer unit 124 to perform image formation (step S106 illustrated in FIG. 3). The image formation performed by the printer unit 124 is a known operation, and thus, detailed description thereof will not be presented.

At this time, the CPU 151 receives a report of an image formation execution status (output (completion of output)/no-output (no-completion of output) for a confidential print job for which image formation is directed by the printer unit 124 (step S107 illustrated in FIG. 3).

The CPU 151 that has received the report of the completion of image formation for the confidential print job from the printer control unit 124b moves the corresponding confidential print job from the output job reservation list screen 123G5 (FIG. 10) to an output job history list screen to be described later and displays the state of the completion of output of the image formation (step S108 illustrated in FIG. 3).

On the other hand, the CPU 151 that has received the report of no-completion of image formation for the confidential print job from the printer control unit 124b moves the corresponding confidential print job from the output job reservation list screen 123G5 (FIG. 10) to a no-output job history list, screen to be described later and displays the state of no completion of output of the image formation (step S109 illustrated in FIG. 3).

Detailed Operation (1)

Hereinafter, description of the display of the output job reservation list screen 123G5 of a case where image formation is directed with a confidential print job selected will be continued with reference to a flowchart illustrated in FIG. 8 and display screen explanatory diagrams of FIG. 9 and subsequent diagrams.

Figure 8:
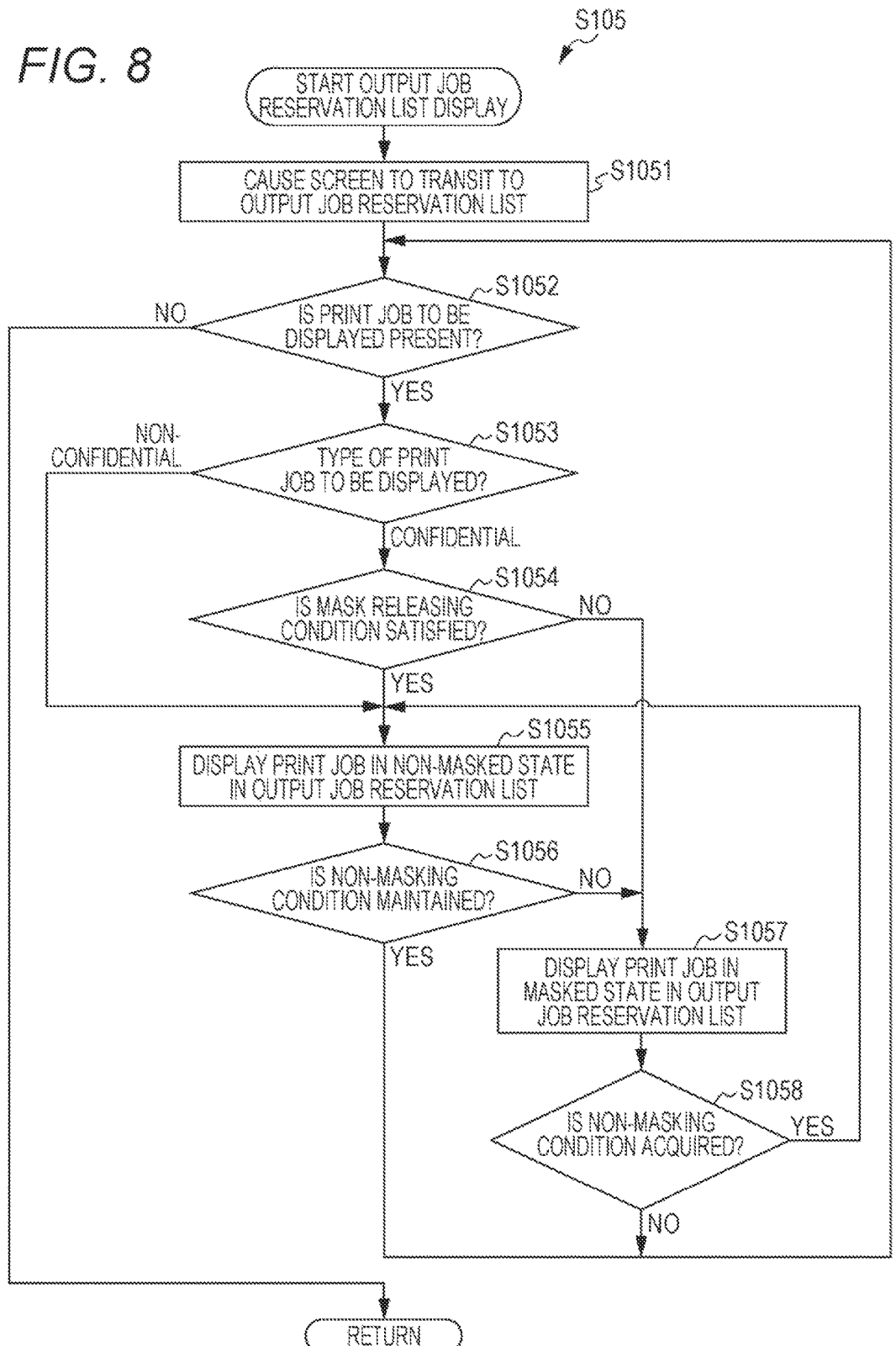
FIG. 8 is a flowchart that illustrates a detailed operation of an image forming apparatus according to an embodiment of the present invention.

The CPU 151 that has received a direction of image formation of a confidential print job transits from the confidential job list screen 123G4 as a screen displayed in the operation display unit 123 to the output job reservation list screen 123G5 (step S1051 illustrated in FIG. 8).

The CPU 151 checks whether a print job to be displayed on the output job reservation list screen 123G5 is present and checks the status of execution of image formation of a print job and an image formation reservation status of a print job (step S1052 illustrated in FIG. 8).

In a case where a print job to be displayed on the output job reservation list screen 123G5 is present (YES in step S1052 illustrated in FIG. 8), the CPU 151 determines the type of the print job to be displayed (step S1053 illustrated in FIG. 8). Here, the type of the print job to be displayed is one of a confidential print job stored in a confidential box to which a password is assigned and a non-confidential print job not corresponding to the confidential print job.

In a case where the print job to be displayed is a non-confidential print job ("NON-CONFIDENTIAL" in step S1053 illustrated in FIG. 8), the CPU 151 displays the print job to be displayed on the output job reservation list screen 123G5 in a non-masked state (mask-released state) (step S1055 illustrated in FIG. 8). On the other hand, in a case where the print job is a non-confidential print job, the non-masking condition is continuously maintained (YES in step S1056 illustrated in FIG. 8), and accordingly, the display of the output job reservation list screen 123G5 is continued, and the process ends (End in FIG. 8).

In a case where the print job to be displayed corresponds to a confidential print job ("Confidential" in step S1053 illustrated in FIG. 8), the CPU 151 determines whether or not the corresponding confidential print job satisfies a mask releasing condition (step S1054 illustrated in FIG. 8).

Here, as a specific example (first releasing condition) of the mask releasing condition, there is a condition that a confidential box corresponding to a confidential print job is selected on the box display screen 123G2 (FIG. 5) of the operation display unit 123, and a password is input on the password input screen 123G3 (FIG. 6). When a confidential print job satisfying such a first releasing condition (YES in step S1054 illustrated in FIG. 8) is displayed on the output job reservation list screen 123G5, the CPU 151 displays the confidential print job in a mask released state (step S1055 illustrated in FIG. 8).

Here, as a specific example (second releasing condition) of the mask releasing condition, there is a condition that, in the information processing apparatus 20, a confidential box corresponding to a confidential print job is selected, and a password is input, and, the time is within the range of a fixed time (for example, 10 minutes) from the input of the password. When a confidential print job satisfying such a second releasing condition (YES in step S1054 illustrated in FIG. 8) is displayed on the output job reservation list screen 123G5, the CPU 151 displays the confidential print job in the mask released state (step S1055 illustrated in FIG. 8).

In addition, as a specific example (a third releasing condition (a modified example of the second releasing condition)) of the mask releasing condition, there is a condition that, in a case where a confidential box corresponding to a confidential print job is selected in the operation display unit 123, and a password is input, the time is within the range of a first fixed time (for example, 30 minutes) from the input of the password and, in a case where a confidential box is selected in the information processing apparatus 20, and a password is input, the time is within the range of a second fixed time (for example, five minutes) from the input of the password. When a confidential print job satisfying such a third releasing condition (YES in step S1054 illustrated in FIG. 8) is displayed on the output job reservation list screen 123G5, the CPU 151 displays the confidential print job in the mask released state (step S1055 illustrated in FIG. 8). Here, it is appropriate for maintaining confidentiality that the second fixed time of a case where a password is input from the external information processing apparatus 20 is set to be shorter (or not larger) than the first fixed time of a case where a password is input from the operation display unit 123.

In a case where management is performed using a fixed time from the input of a password, for a confidential print job, when a fixed time elapses after the input of the password, the non-masking condition is not maintained (NO in step S1056 illustrated in FIG. 8), and accordingly, the display of the mask released state of the output job reservation list screen 123G5 is changed to display of the masked state (step S1057 illustrated in FIG. 8).

In a case where a confidential print job does not satisfy the first releasing condition (NO in step S1054 illustrated in FIG. 8) or also in a case where a confidential print job cannot maintain the original satisfaction of the second releasing condition or the third releasing condition described above (YES in step S1054 illustrated in FIG. 8 and NO in steps S1055 and S1056), in a case where a user inputs a password from the operation display unit 123, the non-masking condition is acquired (YES in step S1058 illustrated in FIG. 8), and accordingly, the display of the masked state of the output job reservation list screen 123G5 is changed to display of the mask released state (step S1055 illustrated in FIG. 8).

The CPU 151 repeats the process described above for all the print jobs to be displayed on the output job reservation list screen 123G5 (YES in step S1052 illustrated in FIG. 8) and ends the process in a case where any other print job to be displayed is not present (NO in step S1052 illustrated in FIG. 8, End).

FIG. 9 is a conventional output job reservation list screen 123G5', and file names of confidential print jobs are in the masked, state. In this specific example, a confidential print job (file name: unknown) 123G5a1 of a user A, a confidential print job (file name: unknown) 123G5a2 of the user A, and a confidential print job (file name: unknown) 123G5e1 of a user E are displayed on the output job reservation list screen 123G5' in the masked state. In this state, it is difficult for the user A to determine whether his confidential print job is in the middle of output or waits for output.

FIG. 10 illustrates an output job reservation list screen 123G5 according to this embodiment. On the output job reservation list screen 123G5, file names of some confidential print jobs are in the mask released state, and a file name of the other confidential print job is in the masked state. In this specific example, a confidential print job (file name: file A1) 123G5A1 of a user A, a confidential print job (file name: file A2) 123G5A2 of the user A are displayed on the output job reservation list screen 123G5 in the mask released state. In such a state, the user A can easily determine whether each of his confidential print jobs is in the middle of output or is waiting for output. In this case, the user A is in the state satisfying the non-masking condition by inputting a password or the like, and the confidentiality is maintained. In addition, the confidential print job (file name: unknown) 123G5E1 of the user E does not satisfy the non-masking condition, and an appearance, in which the confidential print job 123G5E1 is displayed on the output job reservation list screen 123G5 in the masked state, is illustrated. For example, the user E is in a state not inputting a password or the like, and the confidentiality is maintained.

As above, in an output job reservation list that is in a public state in which confidential print jobs and normal print jobs of other persons, and confidential print jobs of other persons are displayed in a mixed state, a user can acquire the state of his job from a public display list while securing the confidentiality of a confidential print job in a predetermined range.

Content of Table in Detailed Operation (1)

In the description of the operation of the embodiment described above, the determination (steps S1054, S1056, and S1058 illustrated in FIG. 8) of whether or not a confidential print job satisfies the mask releasing condition is performed by the CPU 151 referring to tables described below.

Figure 11:
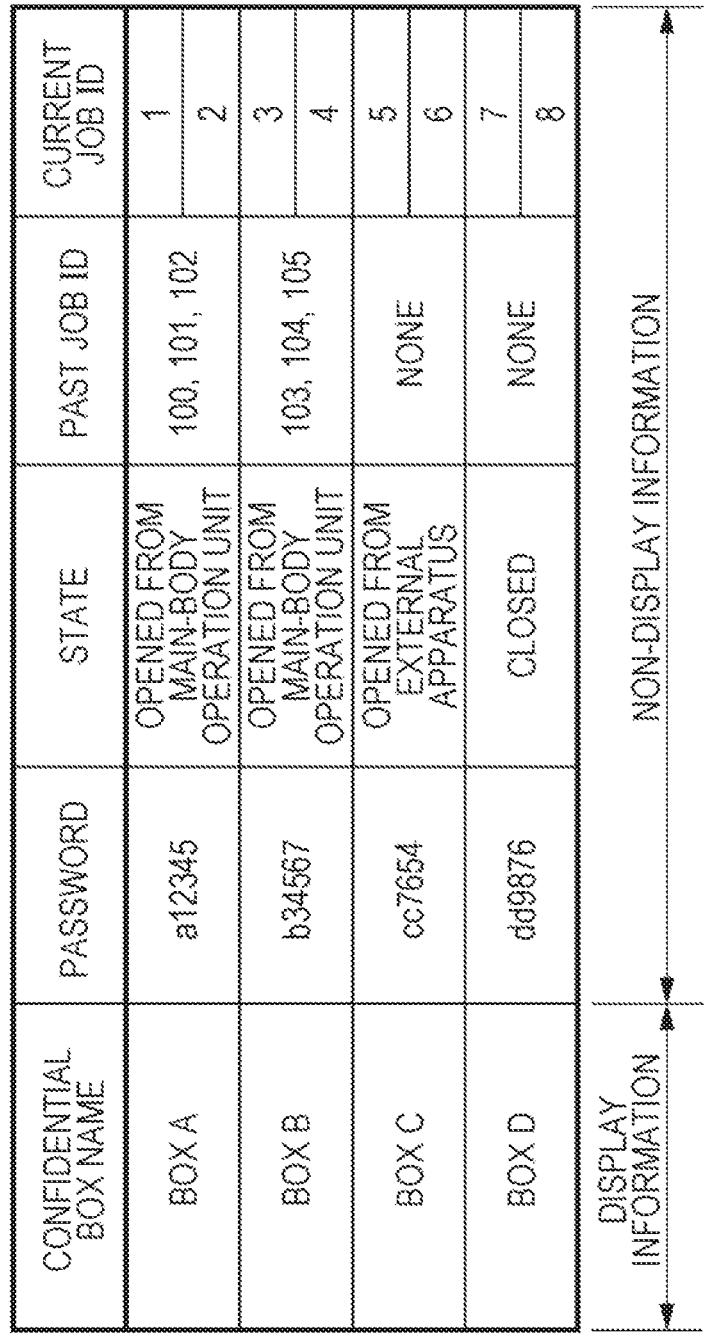
FIG. 11 is a schematic diagram that illustrates an example of a table in an image forming apparatus according to an embodiment of the present invention.

FIG. 11 illustrates an example of a first table in which information used for displaying the confidential box list is stored. In this first table, a confidential box name, a password, a state, past job IDs, and current job IDs are stored in association with each confidential box. In other words, the CPU 151 stores corresponding information in the table. In this first table, while the confidential box names are display information, the other information (the password, the state, the past job IDs, and the current job IDs) are non-display information. This first table is also a table that is referred to by the CPU 151 at the time of displaying the box display screen 123G2 as a confidential box list.

Here, in the column of the state of the first table, whether the confidential box is open by the operation display unit 123 ("main boy operation unit") of the image forming apparatus or the operation unit ("external device") of the information processing apparatus 20 by inputting a password is stored. In this column of this state, in the case of a reset through pressing of a hard key of the operation display unit 123 or in a case where a fixed time elapses after the mask releasing, the column of the state is changed to "closed". However, even in a case where the box display screen (FIG. 5) is closed, the state is not changed to "closed" but is maintained until reset or an elapse of the fixed time.

In addition, in the column of the past job IDs of the first table, job IDs of confidential print jobs entering a target confidential box in the past are stored. Here, entering the confidential box in the past means that a direction of image formation is made, and a corresponding confidential print job is added to the output job history list in a case where the image formation is complete, and the corresponding confidential print job is added to the no-output job history list in a case where the image formation is incomplete.

In the column of job IDs (current) of the first table, jobs IDs of confidential print jobs that are currently inside a target confidential box are stored. In a case where a user directs image formation of a confidential print job by pressing the output button (123G4a illustrated in FIG. 7) (step S104 illustrated in FIG. 3), the data of the column of the current job IDs is moved to the column of the past job IDs.

FIG. 12 illustrates an example of a second table in which information used for displaying a confidential job list is stored. In this second table, a confidential file name, a user name, an operation mode (printer mode/copy mode), the number of pages, the number of copies are stored in association with each job ID. In other words, the CPU 151 stores corresponding information in the table. In this second table, information (confidential file names, user names, operation modes, the number of pages, and the numbers of copies) other than job IDs is display information. This second table is also a table referred to by the CPU 151 when the confidential job list screen 123G4 is displayed as a confidential job list.

FIG. 13 illustrates an example of a third table in which information used for displaying the output job reservation list is stored. In this third table, a confidential box name, a file name, a user name, an operation mode (printer mode/ copy mode), the number of pages, and a state (in the middle of output/waiting) are stored in association with each job ID, In other words, the CPU 151 stores corresponding information in the table. In this third table, information (file names, user names, operation modes, the numbers of pages, and states) other than job IDs and confidential box names is display information. This third table is also a table that is referred to by the CPU 151 when the output job reservation list screen 123G5 is displayed as an output job reservation list.

As above, each of the first table illustrated in FIG. 11, the second table illustrated in FIG. 12, and the third table illustrated in FIG. 13 includes job IDs. For this reason, when the output job reservation list screen 123G5 is displayed using the third table, the CPU 151 can determine (steps S1054, S1056, and S1058 illustrated in FIG. 8) whether or not a confidential print job as described above satisfies the mask releasing condition by referring to the first table and the second table by using the job ID.

Detailed Operation (2)

Hereinafter, the description of display (step S108 illustrated in FIG. 3) of the output job history list screen 123G6 of a case where image formation is directed with a confidential print job selected, and the confidential print job is normally output (YES in step S107 illustrated in FIG. 3) will be continued with reference to a flowchart illustrated in FIG. 14, a table explanatory diagram illustrated in FIG. 15, and a display screen explanatory diagrams illustrated in FIGS. 16 and 17.

Figure 14:
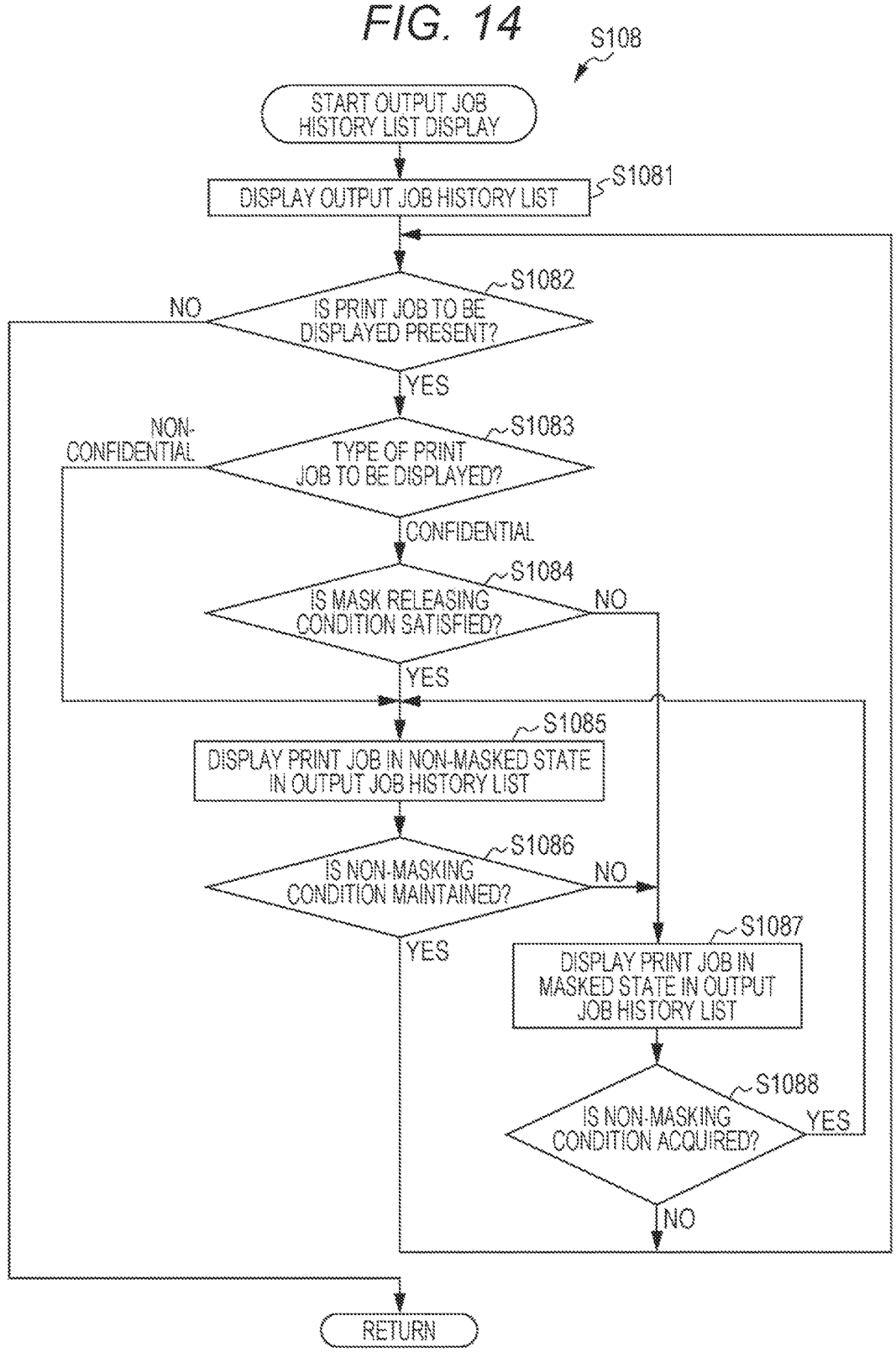
FIG. 14 is a flowchart that illustrates a detailed operation of an image forming apparatus according to an embodiment of the present invention.

The CPU 151 that has received a normal output (completion) report of the image formation of the confidential print job from the printer control unit 124b causes the screen displayed in the operation display unit 123 to transit from the output job reservation list screen 123G5 to the output job history list screen 123G6 (step S1081 illustrated in FIG. 14).

The CPU 151 checks image formation execution statuses of print jobs regarding whether a print job completed as normal output to be displayed on the output job history list screen 123G6 is present (step S1082 illustrated in FIG. 14).

In a case where a print job to be displayed on the output job history list screen 123G6 is present (YES in step S1082 illustrated in FIG. 14), the CPU 151 determines the type of the print job to be displayed (step S1083 illustrated in FIG. 14). Here, the type of the print job to be displayed is one of a confidential print job stored in a confidential box to which a password is assigned and a non-confidential print job not corresponding to a confidential print job.

In a case where the print job to be displayed is a non-confidential print job ("NON-CONFIDENTIAL" in step S1083 illustrated in FIG. 14), the CPU 151 displays the print job to be displayed on the output job history list screen 123G6 in the non-masked state (mask released state) (step S1085 illustrated in FIG. 14). In the case of the non-confidential print job, the non-masking condition is continuously maintained (YES in step S1086 illustrated in FIG. 14), the display of the output job history list screen 123G6 is continued, and the process ends (End in FIG. 14).

On the other hand, in a case where print job to be displayed corresponds to a confidential print job ("CONFIDENTIAL" in step S1083 illustrated in FIG. 14), the CPU 151 determines whether or not the confidential print job satisfies the mask releasing condition (step S1084 illustrated in FIG. 14).

Here, as a specific example (first releasing condition) of the mask releasing condition, there is a condition that a confidential box corresponding to the confidential print job is selected on the box display screen 123G2 (FIG. 5) of the operation display unit 123, and a password is input on the password input screen 123G3 (FIG. 6). When the confidential print job satisfying such a first releasing condition (YES in step S1084 illustrated in FIG. 14) is displayed on the output job history list screen 123G6, the CPU 151 displays the confidential print job in the mask released state (step S1085 illustrated in FIG. 14).

Here, as a specific example (second releasing condition) of the mask releasing condition, a confidential box corresponding to the confidential print job is selected in the information processing apparatus 20, a password is input, and the time is within the range of a fixed time (for example, 10 minutes) from the input of the password. When the confidential print job (YES in step S1084 illustrated in FIG. 14) satisfying such as second releasing condition is displayed on the output job history list screen 123G6, the CPU 151 displays the confidential print job in the mask released state (step S1085 illustrated in FIG. 14).

In addition, as a specific example (a third releasing condition (a modified example of the second releasing condition)) of the mask releasing condition, there is a condition that, in a case where a confidential box corresponding to a confidential print job is selected in the operation display unit 123, and a password is input, the time is within the range of a first fixed time (for example, 30 minutes) from the input of the password and, in a case where a confidential box is selected in the information processing apparatus 20, and a password is input, the time is within the range of a second fixed time (for example, five minutes) from the input of the password. When a confidential print job satisfying such a third releasing condition (YES in step S1084 illustrated in FIG. 14) is displayed on the output job history list screen 123G6, the CPU 151 displays the confidential print job in the mask released state (step S1085 illustrated in FIG. 14). Here, it is appropriate for maintaining confidentiality that the second fixed time of a case where a password is input from the external information processing apparatus 20 is set to be shorter (or not larger) than the first fixed time of a case where a password is input from the operation display unit 123.

On the other hand, in a case where the mask releasing condition is not matched (NO in step S1084 illustrated in FIG. 14), the display of the confidential print job is displayed on the output job history list screen 123G6 in the masked state (step S1087 illustrated in FIG. 14).

In a case where management is performed using a fixed time from the input of a password, for a confidential print job, when a fixed time elapses after the input of the password, the non-masking condition is not maintained (NO in step S1086 illustrated in FIG. 14), and accordingly, the display of the mask released state of the output job history list screen 123G6 is changed to display of the masked state (step S1087 illustrated in FIG. 14).

In a case where a confidential print job does not satisfy the first releasing condition (NO in step S1084 illustrated in FIG. 14) or also in a case where a confidential print job cannot maintain the original satisfaction of the second releasing condition or the third releasing condition described above (YES in step S1084 illustrated in FIG. 14 and NO in steps S1085 and S1086), in a case where a user inputs a password from the operation display unit 123, the non-masking condition is acquired (YES in step S1088 illustrated in FIG. 14), and accordingly, the display of the masked state of the output job history list screen 123G6 is changed to display of the mask released state (step S1085 illustrated in FIG. 14).

The CPU 151 repeats the process described above for all the print jobs to be displayed on the output job history list screen 123G6 (YES in step S1082 illustrated in FIG. 14) and ends the process in a case where any other print job to be displayed is not present (NO in step S1082 illustrated in FIG. 14, End).

In the description of the operation of the embodiment described above, the determination (steps S1084, S1086, and S1088 illustrated in FIG. 14) of whether or not a confidential print job satisfies the mask releasing condition is performed by the CPU 151 referring to tables described below.

FIG. 15 illustrates an example of a fourth table in which information used for displaying the output job history list is stored. In this fourth table, a confidential box name, a file name, a user name, an operation mode (printer mode/copy mode), the number of pages, and an output history (end) are stored in association with each job ID. In other words, the CPU 151 stores corresponding information in the table. In this fourth table, information (the file name, the user name, the operation mode, the number of pages, and the output history) other than the job ID and the confidential box name is display information. This fourth table is also a table that is referred to by the CPU 151 at the time of displaying the output job history list screen 123G6 as an output job history list.

As described above, each of the first table illustrated in FIG. 11, the second table illustrated in FIG. 12, and the fourth table illustrated in FIG. 15 includes a job ID. For this reason, when the output job history list screen 123G6 is displayed using the fourth table, the CPU 151 can determine (steps S1084, S1086, and S1088 illustrated in FIG. 14) whether or not a confidential print job as described above satisfies the mask releasing condition by referring to the first table and the second table by using the job ID.

FIG. 16 illustrates a conventional output job history list screen 123G6'. On the output job history list screen 123G6', the file name of each confidential print job is in the masked state. In this specific example, a confidential print job (file name: unknown) 123G6a1 of a user A, a confidential print job (file name: unknown) 123G6d1 of a user D, and a confidential print job (file name: unknown) 123G6e1 of a user E are displayed on the output job history list screen 123G6' in the masked state. In such a state, it is difficult for the user A to determine whether his confidential print job is in the middle of being output or waiting for output.

FIG. 17 illustrates an output job history list screen 123G6 according to this embodiment. On the output job history list screen 123G6, file names of some confidential print jobs are in the mask released state, and file names of the other confidential print jobs are in the masked state. In this specific example, a confidential print job (file name: File A100) 123G6A1 opened from a confidential box A is displayed on the output job history list screen 123G6 in the mask released state. On the other hand, a confidential print job (file name: unknown) 123G6D1 of a user D and a confidential print job (file name: unknown) 123G6E1 of a user E do not satisfy the non-masking condition, and an appearance is illustrated in which the confidential print jobs are displayed, on the output job history list screen 123G6 in the masked state.

As above, in an output job history list that is in the public state in which confidential print jobs, normal print jobs of the other persons, and confidential print jobs of the other persons are displayed in a mixed state, a user can acquire the states of his jobs from the public display list while securing the confidentiality of the confidential print jobs in a predetermined range.

Detailed Operation (3)

Hereinafter, the description of display (step S109 illustrated in FIG. 3) of a no-output job history list screen 123G7 of a case where image formation is directed with a confidential print job selected, and the confidential print job is not normally output (NO (NO-OUTPUT) in step S107 illustrated in FIG. 3) will be continued with reference to a flowchart illustrated in FIG. 18, a table explanatory diagram illustrated in FIG. 19, and display screen explanatory diagrams illustrated in FIGS. 20 and 21.

Figure 18:
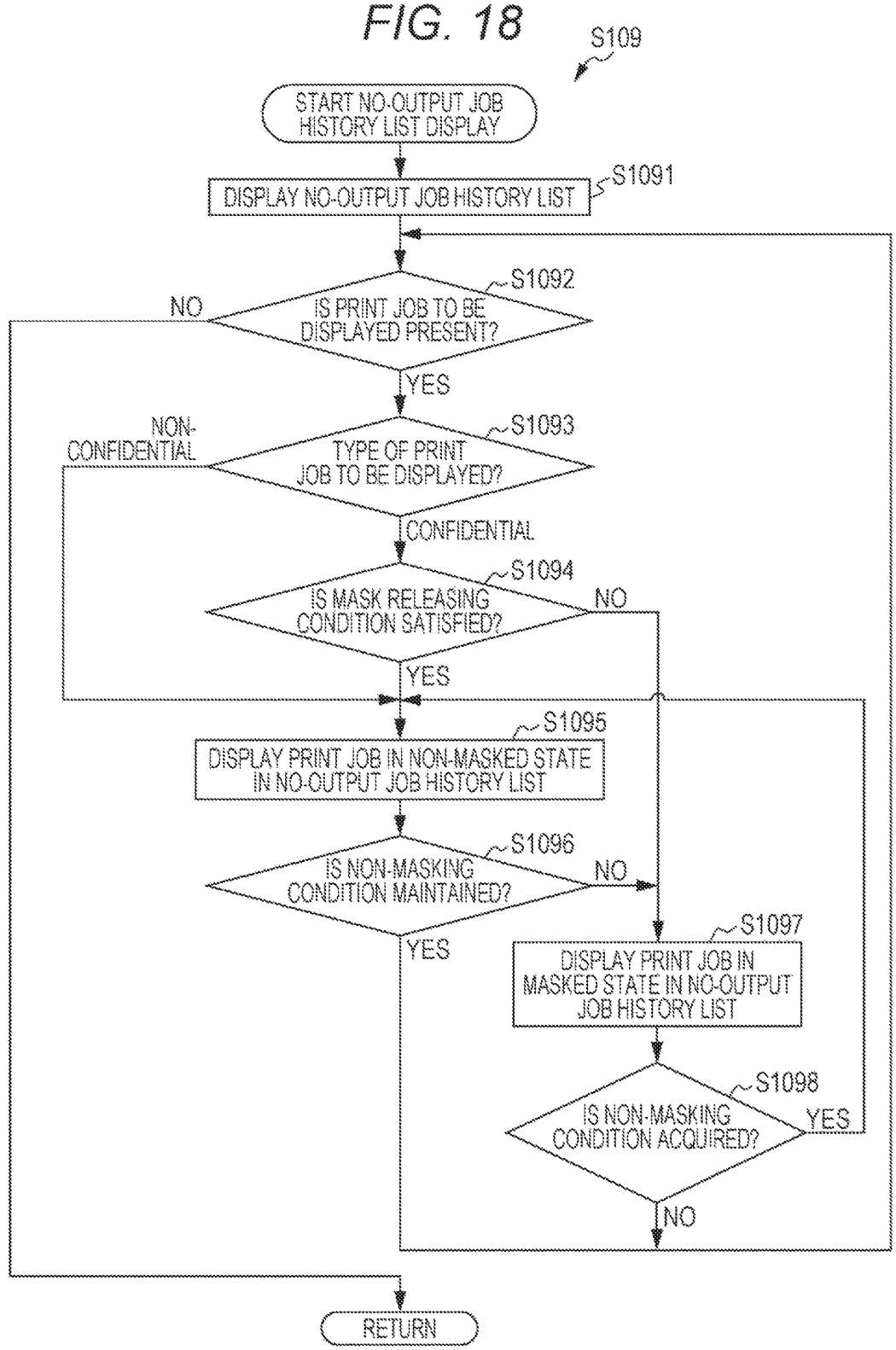
FIG. 18 is a flowchart that illustrates a detailed operation of an image forming apparatus according to an embodiment of the present invention.

The CPU 151 that has received a no-output (no-completion) report of image formation of a confidential print job from the printer control unit 124b causes the screen displayed in the operation display unit 123 to transit from the output job reservation list screen 123G5 to the no-output job history list screen 123G7 (step S1091 illustrated in FIG. 18).

The CPU 151 checks the image formation execution statuses of print jobs regarding whether a print job ending with no output to be displayed on the no-output job history list screen 123G7 is present (step S1092 illustrated in FIG. 18).

In a case where a print job to be displayed on the no-output job history list screen 123G7 is present (YES in step S1092 illustrated in FIG. 18), the CPU 151 determines the type of the print job to be displayed (step S1093 illustrated in FIG. 18). Here, the type of the print job to be displayed is one of a confidential print job stored in a confidential box to which a password is assigned and a non-confidential print job not corresponding to the confidential print job.

In a case where the non-print job to be displayed is a non-confidential print job ("NON-CONFIDENTIAL" in step S1093 illustrated in FIG. 18), the CPU 151 displays the print job to be displayed on the no-output job history list screen 123G7 in a non-masked state (mask released state) (step S1095 illustrated in FIG. 18). On the other hand, in a case where the print job is a non-confidential print job, the non-masking condition is continuously maintained (YES in step S1096 illustrated in FIG. 18), and accordingly, the display of the no-output job history list screen 123G7 is continued, and the process ends (End in FIG. 18).

In a case where the print job to be displayed corresponds to a confidential print job ("CONFIDENTIAL" in step S1093 illustrated in FIG. 18), the CPU 151 determines whether or not the corresponding confidential print job satisfies a mask releasing condition (step S1094 illustrated, in FIG. 18).

Here, as a specific example (first releasing condition) of the mask releasing condition, there is a condition that a confidential box corresponding to a confidential print job is selected on the box display screen 123G2 (FIG. 5) of the operation display unit 123, and a password is input on the password input screen 123G3 (FIG. 6). When a confidential print job satisfying such a first releasing condition (YES in step S1094 illustrated in FIG. 18) is displayed on the no-output job history list screen 123G7, the CPU 151 displays the confidential print job in a mask released state (step S1095 illustrated in FIG. 18).

Here, as a specific example (second releasing condition) of the mask releasing condition, a confidential box corresponding to the confidential print job is selected in the information processing apparatus 20, a password is input, and the time is within the range of a fixed time (for example, 10 minutes) from the input of the password. When the confidential print job satisfying such a second releasing condition (YES in step S1094 illustrated in FIG. 18) is displayed on the no-output job history list screen 123G7, the CPU 151 displays the confidential print job in the mask released state (step S1095 illustrated in FIG. 18).

In addition, as a specific example (a third releasing condition (a modified example of the second releasing condition)) of the mask releasing condition, there is a condition that, in a case where a confidential box corresponding to a confidential print job is selected in the operation display unit 123, and a password is input, the time is within the range of a first fixed time (for example, 30 minutes) from the input of the password and, in a case where a confidential box is selected in the information processing apparatus 20, and a password is input, the time is within the range of a second fixed time (for example, five minutes) from the input of the password. When a confidential print job satisfying such a third releasing condition (YES in step S1094 illustrated in FIG. 18) is displayed on the no-output job history list screen 123G7, the CPU 151 displays the confidential print job in the mask released state (step S1095 illustrated in FIG. 18). Here, it is appropriate for maintaining confidentiality that the second fixed time of a case where a password is input from the external information processing apparatus 20 is set to be shorter (or not larger) than the first fixed time of a case where a password is input from the operation display unit 123.

On the other hand, in a case where the mask releasing condition is not matched (NO in step S1094 illustrated in FIG. 18), the display of the confidential print job is displayed on the no-output job history list screen 123G7 in the masked state (step S1097 illustrated in FIG. 18).

In a case where management is performed using a fixed time from the input of a password, for a confidential print job, when a fixed time elapses after the input of the password, the non-masking condition is not maintained (NO in step S1096 illustrated in FIG. 18), and accordingly, the display of the mask released state of the no-output job history list screen 123G7 is changed to display of the masked state (step S1097 illustrated in FIG. 18).

In a case where a confidential print job does not satisfy the first releasing condition (NO in step S1094 illustrated in FIG. 18) or also in a case where a confidential print job cannot maintain the original satisfaction of the second releasing condition or the third releasing condition described above (YES in step S1094 illustrated in FIG. 18 and NO in steps S1095 and S1096), in a case where a user inputs a password from the operation display unit 123, the non-masking condition is acquired (YES in step S1098 illustrated in FIG. 18), and accordingly, the display of the masked state of the no-output job history list screen 123G7 is changed to display of the mask released state (step S1095 illustrated in FIG. 18).

The CPU 151 repeats the process described above for all the print jobs to be displayed on the no-output job history list screen 123G7 (YES in step S1092 illustrated in FIG. 18) and ends the process in a case where any other print job to be displayed is not present (NO in step S1092 illustrated in FIG. 18, End).

In the description, of the operation of the embodiment described above, the determination (steps S1094, S1096, and S1098 illustrated in FIG. 18) of whether or not a confidential print job satisfies the mask releasing condition is performed by the CPU 151 referring to tables described below.

FIG. 19 illustrates an example of a fifth table in which information used for displaying the no-output job history list is stored. In this fifth table, a confidential box name, a file name, a user name, and a no-output, history (job cancellation/over-user limit/over-storage number/over-section limit, or the like) are stored in association with each job ID. In other words, the CPU 151 stores corresponding information in the table.

In this fifth table, information (a file name, a user name, and a no-output history) other than a job ID and a confidential box name is display information. This fifth table is also a table that is referred to by the CPU 151 at the time of displaying the no-output job history list screen 123G7 as an output job history list.

As described above, each of the first table illustrated in FIG. 11, the second table illustrated in FIG. 12, and the fifth table illustrated in FIG. 19 includes a job ID. For this reason, when the no-output job history list screen 123G7 is displayed using the fifth table, the CPU 151 can determine (steps S1094, S1096, and S1098 illustrated in FIG. 18) whether or not a confidential print job as described above satisfies the mask releasing condition by referring to the first table and the second table by using the job ID.

FIG. 20 illustrates a conventional no-output job history list screen 123G7'. On the no-output job history list screen 123G7', file names of confidential print jobs are in the masked state. In this specific example, a confidential print job (file name: unknown) 123G7a1 of a user A, a confidential print job (file name: unknown) 123G7d1 of a user D, and a confidential print job (file name: unknown) 123G7e1 of a user E are displayed on the no-output job history list screen 123G7' in the masked state. In such a state, it is difficult for the user A to determine whether or not his confidential print job has not been output.

FIG. 21 illustrates a no-output job history list screen 123G7 according to this embodiment. On the no-output job history list screen 123G7, file names of some confidential print jobs are in the mask released state, and file names of the other confidential print jobs are in the masked state. In this specific example, a confidential print job (file name: File A100) 123G7A1 opened from a confidential box A is displayed on the no-output job history list screen 123G7 in the mask released state. On the other hand, a confidential print job (file name: unknown) 123G7D1 of a user D and a confidential print job (file name: unknown) 123G7E1 of a user E do not satisfy the non-masking condition, and an appearance is illustrated in which the confidential print jobs are displayed on the no-output job history list screen 123G7 in the masked state.

As above, in an output job history list that is in the public state in which confidential print jobs, normal print jobs of the other persons, and confidential print jobs of the other persons are displayed in a mixed state, a user can acquire the states of his jobs from the public display list while securing the confidentiality of the confidential print jobs in a predetermined range.

Detailed Operation (4)

Hereinafter, in the display (step S108 illustrated in FIG. 3) of a no-output job history list screen 123G7 of a case (NO (NO-OUTPUT) in step S107 illustrated in FIG. 3) where image formation is directed with a confidential print job selected, and the confidential print job is not normally output, an operation after the deletion of the confidential print job will be described with reference to a table explanatory diagram illustrated in FIG. 22, a display screen explanatory diagram illustrated in FIG. 23, and a flowchart illustrated in FIG. 24.

As described above, on the confidential job list screen 123G4 (FIG. 7) displayed in the operation display unit 123, in the state in which the confidential print job is selected, by user's pressing the button Delete 1 (123G4d illustrated in FIG. 7), a confidential box to which the selected confidential print job belongs can be directed to be deleted. In such a case, the confidential print job is deleted by the CPU 151 together with the confidential box. In addition, in the state in which the confidential print job is selected, by user's pressing the button Delete 2 (123G4e illustrated in FIG. 7), the selected confidential print job can be directed to be deleted.

When the confidential box and the confidential print job are deleted by the CPU 151 based on such a deletion direction, also for the first table (confidential box list) and the second table (confidential job list), information of the confidential box and the confidential print job is deleted.

For this reason, even when the user desires to check the output history of the confidential print job after the deletion described above, the information to be referred to is not present in the first table and the like. Accordingly, on the output job history list screen 123G6 (Operation (2): FIG. 17), mask releasing cannot be performed for the file name that is in the masked state. Similarly, even when the user desires to check the no-output history of the confidential print job after the deletion described above, the information to be referred to is not present in the first table and the like. Accordingly, on the no-output job history list screen 123G7 (Operation (3): FIG. 21), mask releasing cannot be performed for the file name that is in the masked state.

For the mask releasing (Detailed Operation (2)) performed at the time of checking the output history or the mask releasing (Detailed Operation (3)) performed at the time of checking the no-output history as above, as Detailed Operation (4), the process as below is performed. Here, while the no-output history will be described, the process may be similarly performed also for the output history. Hereinafter, the operation of Detailed Operation (4) will be described with reference to a fifth table (no-output job history list (corresponding to deletion of a confidential box)) illustrated in FIG. 22, a no-output job history list screen 123G7 illustrated in FIG. 23, and a flowchart illustrated in FIG. 24.

In the flowchart illustrated in FIG. 24, a same step number is assigned to a portion common to that of Detailed Operation (2) described with reference to FIG. 14 and Detailed Operation (3) described with reference to FIG. 18, and duplicate description thereof will not be presented.

Figure 24:
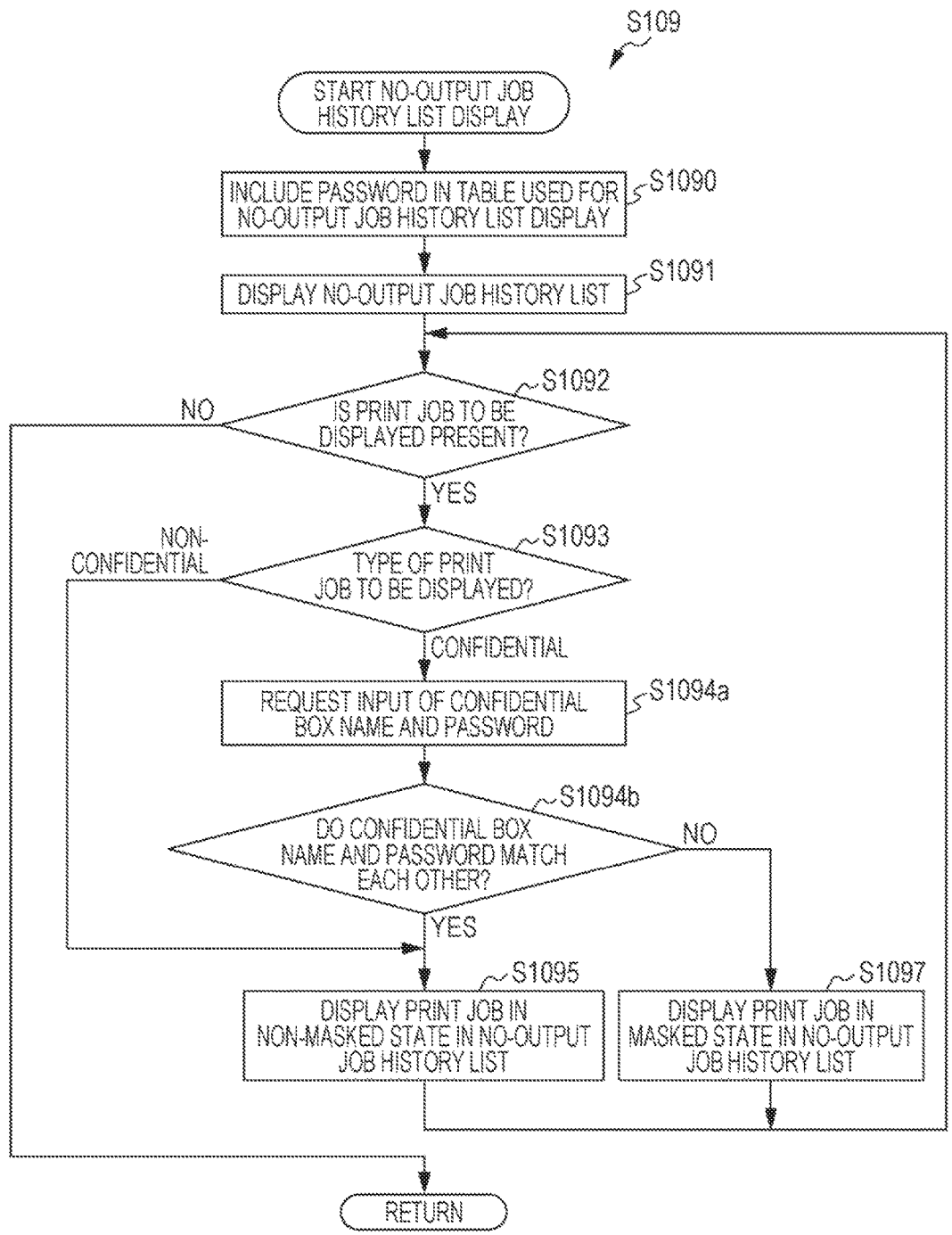
FIG. 24 is a flowchart that illustrates a detailed operation of an image forming apparatus according to an embodiment of the present invention.

First, in the fifth table (FIG. 22) of the no-output job history list (corresponding to deletion of a confidential box), the password of each print job is maintained as non-display information (step S1090 illustrated in FIG. 24). FIG. 22 illustrates the fifth table in which information used for displaying a no-output job history list is stored. In this fifth table, a confidential box name, a password, a file name, a user name, a no-output history (job cancellation/over-user limit/over-storage number/over-section limit, or the like) are stored in association with each job ID. In other words, the CPU 151 stores corresponding information in the table.

In a case where a report of no-output (no completion) of image formation of a confidential print job is received from the printer control unit 124*b* or in a case where a request for displaying a no-output history list is received from the user, the CPU 151 causes the screen displayed in the operation display unit 123 to transit to the no-output job history list screen 123G7 (step S1091 illustrated in FIG. 24).

The CPU 151 checks the image formation execution statuses of print jobs regarding whether a print job ending with no output to be displayed on the no-output job history list screen 123G7 is present (step S1092 illustrated in FIG. 24).

In a case where a print job to be displayed on the no-output job history list screen 123G7 is present (YES in step S1092 illustrated in FIG. 24), the CPU 151 determines the type of the print job to be displayed (step S1093 illustrated in FIG. 24). Here, the type of the print job to be displayed is one of a confidential print job and a non-confidential print job.

In a case where the print job to be displayed is a non-confidential print job ("NON-CONFIDENTIAL" in step S1093 illustrated in FIG. 24), the CPU 151 displays the print job to be displayed on the no-output job history list screen 123G7 in the non-masked state (mask released state) (step S1095 illustrated in FIG. 24).

In a case where the print job to be displayed corresponds to a confidential print job ("CONFIDENTIAL" in step S1093 illustrated in FIG. 24), the CPU 151 requests the user to input a confidential box name and a password (step S1094*a* illustrated in FIG. 24) by displaying an input screen 123G7PW requesting to input the confidential box name and the password on the no-output job history list screen 123G7 (FIG. 23).

Then, the CPU 151, for a corresponding confidential print job, collates a confidential box name and a password stored in the fifth table (FIG. 22) with the confidential box name and the password input by the user on the input screen 123G78PW illustrated in FIG. 23 (step S1094*b* illustrated in FIG. 24). In other words, the CPU 151 determines whether or not the confidential print job satisfies the mask releasing condition by collating the information stored in the fifth table with the information input from the user (step S1094 illustrated in FIG. 24).

By collating the information stored in the fifth table with the information input from the user, in a case where the confidential box names and the passwords are collated with each other (YES in step S1094 illustrated in FIG. 24), the CPU 151 displays the confidential print job in the mask released state when the confidential print job is displayed on the no-output job history list screen 123G7 (step S1095 illustrated in FIG. 24).

On the other hand, by collating the information stored in the fifth table with the information input from the user, in a case where the confidential box names and the passwords are not collated with each other (NO in step S1094 illustrated in FIG. 24), the CPU 151 displays the confidential print job in the masked state when the confidential print job is displayed on the no-output job history list screen 123G7 (step S1097 illustrated in FIG. 24).

The CPU 151 repeats the process described above for all the print jobs to be displayed on the no-output job history list screen 123G7 (YES in step S1092 illustrated in FIG. 24) and ends the process in a case where any other print job to be displayed is not present (NO in step S1092 illustrated in FIG. 24, End).

As above, since the CPU 151 displays the screen requesting to input a password required for controlling the mask released state in the operation display unit 123, also after a confidential box or a confidential print job that is a source is deleted, a user can acquire the history of his job in a public display list in a predetermined range while securing the confidentiality of a confidential print job.

In the description presented above, while the specific example relates to the no-output job history list screen 123G7, the operation is not limited thereto but may be applied to the output job history list screen 123G6 or other various display screens that are in the public state.

Detailed Operation (5)

Here, as Detailed Operation (5), an example of a case where, after a confidential print job is output from a confidential box, the confidential box name thereof is changed, and the confidential box is deleted will be described. This example applies not only to a confidential box name but also to a password.

Figure 25:
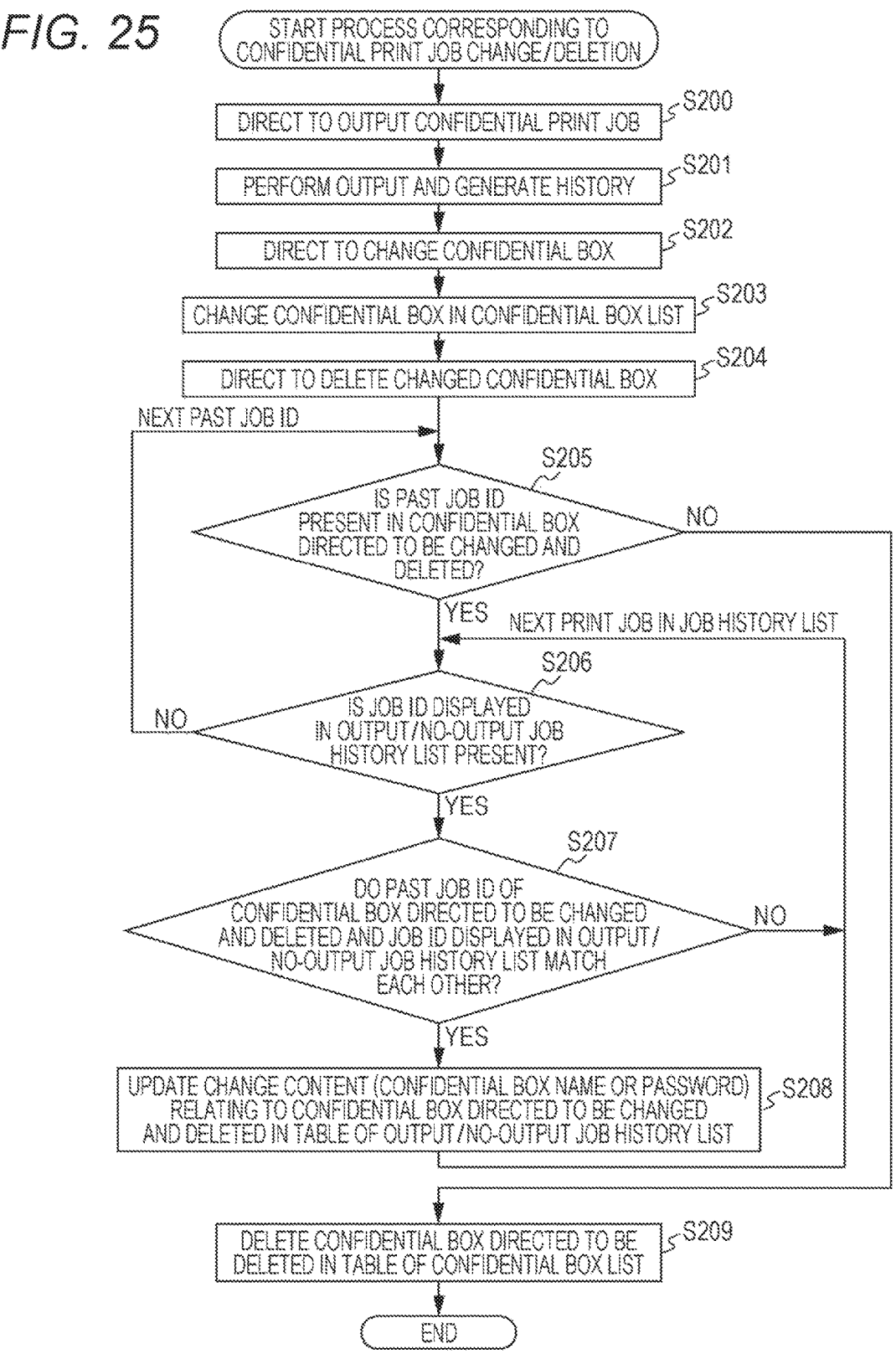
FIG. 25 is a flowchart that illustrates a detailed operation of an image forming apparatus according to an embodiment of the present invention.

After a confidential box is opened by inputting a password for the confidential box, a user directs image formation with a confidential print job selected (step S200 illustrated in FIG. 25). Here, when the image formation normally ends, under the control of the CPU 151, the job ID of the confidential print job is moved from the field of the current job IDs to the field of the past job IDs in the first table of the confidential box list, and, in parallel with this, a history is generated in the fourth table of the output job history list. On the other hand, in a case where the image formation does not normally end, under the control of the CPU 151, the job ID of the confidential print job is moved from the field of the current job IDs to the field of the past job IDs in the first table of the confidential box list, and, in parallel with this, a history is generated in the fifth table of the no-output job history list (step S201 illustrated in FIG. 25).

In addition, in the fourth table of the output job history list and the fifth table of the no-output job history list, similarly to Detailed Operation (4) described above, a password of each print job is maintained in the non-display information.

Here, a direction for changing the box name or the password of the confidential box is assumed to be made from a user (step S202 illustrated in FIG. 25). On the confidential job list screen 123G4 illustrated in FIG. 7, when the button Edit 1 (123G4*b* illustrated in FIG. 7) is pressed in the state in which a confidential print job is selected, the screen is returned to the password input screen 123G3 illustrated in FIG. 6, and the password of a confidential box to which the selected confidential print job belongs can be changed. In addition, on the confidential job list screen 123G4 illustrated in FIG. 7, when a button Edit 2 (123G4*c* illustrated in FIG. 7) is pressed in a state in which a confidential print job is selected, a setting change (for example, changing the confidential box name) for the selected confidential print job can be directed.

In this way, the CPU 151 that has received the direction for changing the confidential box changes the box name or the password of the confidential box in accordance with the direction (step S203 illustrated in FIG. 25). In addition, the CPU 151 performs such a change for the confidential box for the first table as a confidential box list.

In the first table as the confidential box list illustrated in FIG. 26 represents a state in which the box name of a confidential box A is changed from "Box A" to "Box E". Even when the first table as the confidential box list is changed, the output history of the fourth table of the output job history list and the no-output history of the fifth table of the no-output job history list are not updated at this time point.

In addition, a direction for deleting a confidential box is assumed to be made from the user (step S2024 illustrated in FIG. 25). On the confidential job list screen 123G4 (FIG. 7) displayed in the operation display unit 123, in a state in which a confidential print job is selected, when the user presses the button Delete 1 (123G4*d* illustrated in FIG. 7), a direction for deleting a confidential box to which the selected confidential print job belongs can be made.

Based on such a deletion direction, the CPU 151 performs the following process before deleting the confidential box.

Here, the CPU 151 checks whether a past job ID is present in the confidential box "Box E" for which the direction for the change and the deletion is made by using the first table as a confidential box list (step S205 illustrated in FIG. 25). The presence of the past job ID means that a history corresponding to the fourth table of the output history list or the fifth table of the no-output history list is present.

Here, in a case where any past job ID is not present in the confidential box "Box E" for which the direction for the change and the deletion is made (NO in step S205 illustrated in FIG. 25), the CPU 151 performs deletion of the confidential box that has been directed (step S209 illustrated in FIG. 25). In addition, in a case where the confidential box is deleted by the CPU 151 in accordance with such a deletion direction, information relating to the confidential box is deleted also from the first table (confidential box list) and the second table (confidential job list).

On the other hand, in a case where a past job ID is present in the confidential box "Box E" for which the direction for the change and the deletion is made (YES in step S205 illustrated in FIG. 25), the CPU 151 searches for a job ID of a print job to be displayed from the fourth table of the output job history list and the fifth table of the no-output job history list (step S206 illustrated in FIG. 25).

In a case where any print job to be displayed is not present in the fourth table of the output job history list and the fifth table of the no-output job history list (NO in step S206 illustrated in FIG. 25), the CPU 151 searches for another past job ID in the confidential box "Box E" for which the direction for the change and the deletion is made (step S205 illustrated in FIG. 25).

On the other hand, in a case where a print job to be displayed is present in the fourth table of the output job history list and the fifth table of the no-output job history list (YES in step S206 illustrated in FIG. 25), the CPU 151 determines whether the past job ID included in the confidential box "Box E" for which the direction for the deletion is made and the job ID of the print job to be displayed in the fourth table and the fifth table match each other (step S207 illustrated in FIG. 25).

In a case where the past job ID included in the confidential box "Box E" for which the direction for the deletion is made and the job ID of the print job to be displayed in the fourth table and the fifth table do not match each other (NO in step S207 illustrated in FIG. 25), the CPU 151 searches for another print job to be displayed from the fourth table and the fifth table (step S206 illustrated in FIG. 25).

On the other hand, in a case where the past job ID included in the confidential box "Box E" for which the direction for the deletion is made and the job ID of the print job to be displayed in the fourth table and the fifth table match each other (YES in step S207 illustrated in FIG. 25), the CPU 151 reflects the deletion direction and the changed content (the confidential box name or the password) of the confidential box for which the deletion direction is made on the print job to be displayed in the fourth table and the fifth table having the job ID matching the past job ID included in the confidential box to be deleted (step S208 illustrated in FIG. 25).

Then, the CPU 151 searches for another print job to be displayed in the fourth table and the fifth table (step S206 illustrated in FIG. 25) and repeats the operation described above until there is no match between the past job ID included in the confidential box "Box E" for which the deletion direction is made and the job ID of the print job to be displayed in the fourth table and the fifth table. In addition, the CPU 151 repeats the process described above for all the other past job IDs included in the confidential box "Box E" for which the direction for the change and the deletion is made (step S205 illustrated in FIG. 25).

Here, when the searches for all the print jobs (step S206 illustrated in FIG. 25) to be displayed in the fourth table and the fifth table having job IDs matching all the past job IDs present in the confidential box "Box E" for which the directions for the change and the deletion are made (step S205 illustrated in FIG. 25) and the reflection (step S206 illustrated in FIG. 25) of the changed contents on the print jobs having the job IDs matching the past job IDs are completed, the CPU 151 deletes the confidential box as is directed (step S209 illustrated in FIG. 25).

In the first table as a confidential box list illustrated in FIG. 26, in step S203 illustrated in FIG. 25, the box name of the confidential box A is changed from "Box A" to "Box E".

Then, in step S207 illustrated in FIG. 25, it is detected that job IDs 100 and 102 present in the fifth table as a no-output job history list illustrated in FIG. 27 match past job IDs 100 and 102 present in the first table as a confidential box list.

As a result, in step S208 illustrated in FIG. 25, the confidential box name "Box A" of the job IDs 100 and 102 present in the fifth table as the no-output job history list illustrated in FIG. 27 is updated with "Box E".

Even in a case where the confidential box is deleted after change, similarly to Detailed Operation (4) described above, by displaying a screen requesting to input a password required for controlling the mask released state in the operation display unit 123 by using the CPU 151 and user's inputting information after the change, the output history and the no-output history can be displayed in the mask released state. In other words, while the confidentiality of the confidential print job is reliably secured, the user can acquire the history of his job in a public display list within a predetermined range.

While the fifth table of the no-output job history list is used as a specific example in the description presented above, the operation is not limited thereto but may be applied to the output job history list or other various display tables that are in the public state.

Detailed Operation (6)

Similarly to Detailed Operation (1) to Detailed Operation (5) described above, in a case where a confidential print job is displayed in the mask released state on a display screen, in which user's print jobs and print jobs of the other persons are mixed, that is in the public state, in a case where a print job that is in the middle of execution is stopped due to an error (any one of various errors such as toner supply, out-of-paper, and a paper type mismatch), the CPU 151 controls the display of the file name of the confidential print job displayed in the operation display unit 123 in the mask released state so as to be returned to the masked state. Accordingly, even in a case where status in which a third party operates the operation display unit occurs for releasing the error, the confidentiality of the confidential print job can be reliably secured.

Similarly to Detailed Operation (1) to Detailed Operation (5) described above, in a case where a confidential print job is displayed in the mask released state on a display screen, in which user's print jobs and print jobs of the other persons are mixed, that is in the public state, in the case of a reset through pressing of a hard key of the operation display unit 123 or in a case where a fixed time elapses from the release of the mask, the CPU 151 controls the display of the file name of the confidential print job displayed in the operation display unit 123 in the mask released state so as to be returned to the masked state. Accordingly, even in a case where status in which a third party operates the operation display unit occurs for releasing the error, the confidentiality of the confidential print job can be reliably secured.

Detailed Operation (7)

In Detailed Operation (1) to Detailed Operation (7) described above, in a case where passwords are input to a plurality of confidential boxes in parallel, the CPU 151 displays file names of all of a plurality of print jobs corresponding to the plurality of confidential boxes in the operation display unit 123 in the mask released state. For this reason, a user can acquire the state of his job in a public display list in a predetermined range while securing the confidentiality of a confidential print job.

In addition, in Detailed Operation (1) to Detailed Operation (7), in a case where the mask releasing condition is satisfied by inputting a password of a confidential box, the CPU 151 displays file names of all of a plurality of print jobs stored in a same confidential box in the operation display unit 123 in the mask released state. For this reason, a user can acquire the state of his job in a public display list in a predetermined range while securing the confidentiality of a confidential print job.

Other Embodiments

As above, while the embodiments of the present invention have been described with reference to the drawings, specific configurations and specific screen displays are not limited to those illustrated in the embodiments. Thus, changes or additions in a range not departing from the concept of the present invention belong to the present invention.

In addition, in the embodiments, while an example of the configuration has been illustrated in which the printer controller 110 is built inside the image forming apparatus 100, the printer controller 110 may be disposed to be separate from the image forming apparatus 100.

According to an embodiment of the present invention described above, the following effects can be acquired.

(1) For a print job stored in a confidential box, when a status such as an output reservation, an output history, or a no-output history is managed in an operation display unit of an image forming apparatus, basically, a file name of the print job is controlled to be displayed in the operation display unit in a masked state. Here, for the print job stored in the confidential box, when a status such as an output reservation, an output history, or a no-output history is managed, in a case where a password corresponding to the confidential box is input to the operation display unit, the file name of the print job is controlled to be displayed in the operation display unit in a mask released state. In other words, when the status of a print job stored in the confidential box is managed in the operation display unit, basically, the file name of the print job is displayed in the operation display unit in the masked state, and, in a case where a condition that the password corresponding to the confidential box is input to the operation display unit is satisfied, the file name of the print job is displayed in the operation display unit in the mask released state. Accordingly, a user can acquire the state of his job in a public display list while securing the confidentiality of the confidential print job.

(2) When the status of a print job stored in a confidential box is managed, basically, the file name of the print job is controlled to be displayed in the operation display unit in the masked state. Here, when the status of a print job stored in the confidential box is managed, in a case where a password corresponding to the confidential box is input from one of the operation display unit, an external PC, or the like, the file name of the print job is controlled to be displayed in the operation display unit for a fixed period in the mask released state. In other words, when the status of a print job stored in the confidential box is managed in the operation display unit, basically, the file name of the print job is displayed in the operation display unit in the masked state, and, in a case where a condition that the password corresponding to the confidential box is input from one part is satisfied, the file name of the print job is displayed in the operation display unit in the mask released state over a fixed period. Then, also in a case where the display is performed in the mask released state, after the fixed period, the display is returned to the masked state. Accordingly, a user can acquire the state of his job in a public display list while securing the confidentiality of the confidential print job.

(3) In (1) described above, for a fixed period after the input of the password corresponding to the confidential box from one part other than the operation display unit, the file name of the print job relating to the confidential box is controlled to be displayed in the operation display unit in the mask released state. In other words, when the status of a print job stored in the confidential box is managed in the operation display unit, basically, the file name of the print job is displayed in the operation display unit in the masked state, and, in a case where a condition that the password corresponding to the confidential box is input to the operation display unit is satisfied, the file name of the print job is displayed in the operation display unit in the mask released state, and, in a case where a condition that the password corresponding to the confidential box is input from one part is satisfied, the file name of the print job is displayed in the operation display unit in the mask released state over a fixed period. Accordingly, a user can acquire the state of his job in a public display list while securing the confidentiality of the confidential print job.

(4) In (2) and (3) described above, in a case where the file name of the confidential print job is displayed in the mask released state, and a fixed time determined in advance elapses, or in a case where a reset, operation is performed in the operation display unit, the display is returned form the mask released state to the masked state. For this reason, a user can acquire the state of his job in a public display list within a predetermined range while securing the confidentiality of the confidential print job.

(5) In (1) to (4) described above, in a case where a predetermined condition is satisfied as display performed in the operation display unit at the time of managing the status, in a state in which the print job relating to the confidential box and a separate print job not relating to the confidential box are mixed, the file name of the confidential print job is displayed in the mask released state. For this reason, a user can acquire the state of his job in a public display list in a predetermined range while securing the confidentiality by applying a predetermined condition to the confidential print job.

(6) In (1) to (5) described above, the print job stored in the confidential box and the confidential box are managed to be associated with each other, and the masked state and the mask released state of the file name of the print job are controlled. Accordingly, a user can acquire the state of his job in a public display list in a predetermined range while reliably securing the confidentiality of the confidential print job.

(7) In (1) to (6) described above, for a plurality of confidential boxes to which passwords are respectively input, the file names of all of the plurality of print jobs are displayed in the operation display unit in the mask released state. For this reason, a user can acquire the state of his job in a public display list in a predetermined range while reliably securing the confidentiality of the confidential print job.

(8) In (1) to (7) described above, in a case where a password of a confidential box is input, file names of all of a plurality of print jobs stored in the same confidential box are displayed in the operation display unit in the mask released state. For this reason, a user can acquire the state of his job in a public display list in a predetermined range while reliably securing the confidentiality of the confidential print job.

(9) In (1) to (8) described above, in a case where the password of the confidential box is changed to a new password, by inputting the new password, the display is controlled to be in the mask released state. For this reason, a user can acquire the state of his job in a public display list in a predetermined range while reliably securing the confidentiality of the confidential print job.

(10) In (1) to (9) described above, in a case where a relation between the confidential box and the password is stored, and, in a case where the status of the confidential print job corresponding to a deleted confidential box is managed, by checking the input of the password corresponding to the deleted confidential box, the mask released state is controlled. For this reason, a user can acquire the state of his job in a public display list in a predetermined range while reliably securing the confidentiality of the confidential print job.

(11) In (1) to (10) described above, a relation between the confidential box and the password is stored, and, in a case where the password corresponding to the confidential box is input from an apparatus other than the image forming apparatus, and a direction of image formation is made, by checking input of the password corresponding to a deleted confidential box to the operation display unit, the mask released state is controlled. For this reason, a user can acquire the state of his job in a public display list in a predetermined range while reliably securing the confidentiality of the confidential print job.

(12) In (10) and (11) described above, since a screen requesting input of a password required to control the mask released state is displayed in the operation display unit, a user can acquire the state of his job in a public display list in a predetermined range while reliably securing the confidentiality of the confidential print job.

(13) In (1) to (12) described above, in a case where a print job that is in the middle of execution is stopped due to an error (any one of various errors such as supply of toner, out-of-paper, and a paper type mismatch), the display of the file name displayed in the operation display unit in the mask released state is controlled to be returned to the masked state. For this reason, even in a situation in which a third party operates the operation display unit for releasing the error occurs, the confidentiality of the confidential print job can be reliably secured.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
   an image forming unit configured to form an image on a sheet;
   a storage unit configured to store a print job while managing a storage area in units of boxes;
   an operation display unit configured to display various kinds of information and receive various directions; and
   a control unit configured to control image formation performed by the image forming unit based on image data in units of print jobs, storage performed by the storage unit, and input and display performed by the operation display unit,
   wherein the control unit is configured to have:

a confidential box function storing the print job in an area of a confidential box that is managed by assigning a password to a box and enabling a direction of image formation output for the print job by accompanying input of the password;

a status managing function managing a status of image formation for the print job for which the image formation output is directed;

an information displaying function displaying various kinds of information in the operation display unit in accordance with the confidential box function and the status managing function; and an image forming function forming an image by using the image forming unit based on the image data in units of the print jobs, and the control unit is configured to control a file name of the print job to be displayed in the operation display unit in a masked state when the status of the print job stored in the confidential box is managed, control the file name of the print job to be displayed in the operation display unit in a mask released state in a list where the status or a history of the print job is displayed in a public manner in a case where the password corresponding to the confidential box is input to the operation display unit when the status is managed for the print job stored in the confidential box, and control the file name of the print job to be displayed on the operation display unit in a masked state or a history of the print job on the operation display unit in a masked state when the password corresponding to the confidential box is not input to the operation display unit;

wherein the control unit is configured to store a relation between the confidential box and the password in the storage unit and, in a case where the status is managed after deletion of the confidential box, in the management of the status, request input of the password corresponding to the deleted confidential box, check the input of the password corresponding to the deleted confidential box, and control the mask released state.

2. The image forming apparatus according to claim 1, wherein the control unit is configured to control the file name of the print job relating to the confidential box to be displayed in the operation display unit in a mask released state for a fixed period after input of the password corresponding to the confidential box from an external information processing apparatus.

3. The image forming apparatus according to claim 1, wherein the control unit is configured to perform display in a state in which the print job and a separate print job not relating to the confidential box are mixed as display performed by the operation display unit at a time of managing the status.

4. The image forming apparatus according to claim 1, wherein the control unit is configured to manage the print job and the confidential box in association with each other for the print job stored in the confidential box and control the masked state and the mask released state of the file name of the print job.

5. The image forming apparatus according to claim 1, wherein a plurality of confidential boxes are arranged, and in a case where the password corresponding to each of the plurality of the confidential boxes is input, the control unit, when the status is managed, controls file names of all of a plurality of the print jobs corresponding to the plurality of the confidential boxes to which the passwords are input to be displayed in the operation display unit in the mask released state.

6. The image forming apparatus according to claim 1, wherein a plurality of the print jobs are stored in the same confidential box, and in a case where the password of the confidential box is input, the control unit, when the status is managed, is configured to control file names of all of the plurality of the print jobs stored in the same confidential box to be displayed in the operation display unit in the mask released state.

7. The image forming apparatus according to claim 1, wherein, in a case where the password of the confidential box is changed to a new password, the control unit is configured to check input of the new password and control the mask released state.

8. The image forming apparatus according to claim 1, wherein the control unit is configured to store a relation between the confidential box and the password in the storage unit and, in a case where a direction of image formation is made by inputting the password corresponding to the confidential box from an apparatus other than the image forming apparatus, in the management of the status, request input of the password corresponding to the confidential box, check the input of the password corresponding to a deleted confidential box to the operation display unit, and control the mask released state.

9. The image forming apparatus according to claim 1, wherein the control unit, in the management of the status, is configured to display a screen requesting input of the password required for controlling the mask released state in the operation display unit.

10. The image forming apparatus according to claim 1, wherein, in a case where the print job in the middle of execution is stopped due to an error, the control unit is configured to control display of file names displayed in the operation display unit in the mask released state to be returned to the masked state.

11. An image forming apparatus comprising:

an image forming unit configured to form an image on a sheet;

a storage unit configured to store a print job while managing a storage area in units of boxes;

an operation display unit configured to display various kinds of information and receive various directions; and a control unit configured to control image formation performed by the image forming unit based on image data in units of print jobs, storage performed by the storage unit, and input and display performed by the operation display unit, wherein the control unit is configured to have:

a confidential box function storing the print job in an area of a confidential box that is managed by assigning a password to a box and enabling a direction of image formation output for the print job by accompanying input of the password;

a status managing function managing a status of image formation for the print job for which the image formation output is directed;

an information displaying function displaying various kinds of information in the operation display unit in accordance with the confidential box function and the status managing function; and an image forming function forming an image by using the image forming unit based on the image data in units of the print jobs, and the control unit is configured to control a file name of the print job to be displayed in the operation display unit in a masked state when the status of the print job stored in the confidential box is managed, control the file name of the print job to be displayed in the operation display unit in a mask released state for a fixed period in a list where the status or a history of the print job is displayed in a public manner in a case where the password corresponding to the confidential box is input when the status is managed for the print job stored in the confidential box, and control the file name of the print job to be displayed on the operation display unit in a masked state or a history of the print job on the operation display unit in a masked state when the password corresponding to the confidential box is not input to the operation display unit;

wherein the control unit is configured to store a relation between the confidential box and the password in the storage unit and, in a case where the status is managed after deletion of the confidential box, in the management of the status, request input of the password corresponding to the deleted confidential box, check the input of the password corresponding to the deleted confidential box, and control the mask released state.

12. The image forming apparatus according to claim 11, wherein the fixed period is a fixed time that is determined in advance or a time until a reset operation is performed in the operation display unit.

13. The image forming apparatus according to claim 11, wherein the control unit is configured to perform display in a state in which the print job and a separate print job not relating to the confidential box are mixed as display performed by the operation display unit at a time of managing the status.

14. The image forming apparatus according to claim 11, wherein the control unit is configured to manage the print job and the confidential box in association with each other for the print job stored in the confidential box and control the masked state and the mask released state of the file name of the print job.

15. The image forming apparatus according to claim 11, wherein a plurality of confidential boxes are arranged, and in a case where the password corresponding to each of the plurality of confidential boxes is input, the control unit, when the status is managed, controls file names of all of a plurality of the print jobs corresponding to the plurality of the confidential boxes to which the passwords are input to be displayed in the operation display unit in the mask released state.

16. The image forming apparatus according to claim 11, wherein a plurality of the print jobs are stored in the same confidential box, and in a case where the password of the confidential box is input, the control unit, when the status is managed, is configured to control file names of all of the plurality of the print jobs stored in the same confidential box to be displayed in the operation display unit in the mask released state.

17. The image forming apparatus according to claim 11, wherein, in a case where the password of the confidential box is changed to a new password, the control unit is configured to check input of the new password and control the mask released state.

18. The image forming apparatus according to claim 11, wherein the control unit is configured to store a relation between the confidential box and the password in the storage unit and, in a case where a direction of image formation is made by inputting the password corresponding to the confidential box from an apparatus other than the image forming apparatus, in the management of the status, request input of the password corresponding to the confidential box, check the input of the password corresponding to a deleted confidential box to the operation display unit, and control the mask released state.

19. The image forming apparatus according to claim 11, wherein, in a case where the print job in the middle of execution is stopped due to an error, the control unit is configured to control display of file names displayed in the operation display unit in the mask released state to be returned to the masked state.

* * * * *